US011011070B2

(12) United States Patent
Brunacini et al.

(10) Patent No.: US 11,011,070 B2
(45) Date of Patent: May 18, 2021

(54) VIRTUAL-IMMERSION COMPUTER WEBPAGES

(71) Applicant: Across the Street Productions Inc., Phoenix, AZ (US)

(72) Inventors: John Nicholas Brunacini, Phoenix, AZ (US); Robert Nicholas Brunacini, Phoenix, AZ (US); Alan Vincent Brunacini, Phoenix, AZ (US)

(73) Assignee: Across The Street Productions Inc., Phoenix, AZ (US)

( * ) Notice: Subject to any disclaimer, the term of this patent is extended or adjusted under 35 U.S.C. 154(b) by 338 days.

(21) Appl. No.: 16/224,925

(22) Filed: Dec. 19, 2018

(65) Prior Publication Data

US 2019/0130779 A1 May 2, 2019

Related U.S. Application Data

(63) Continuation of application No. 14/254,068, filed on Apr. 16, 2014, now abandoned, which is a continuation of application No. 13/103,856, filed on May 9, 2011, now Pat. No. 8,727,782.

(60) Provisional application No. 61/395,277, filed on May 11, 2010, provisional application No. 61/467,354, filed on Mar. 24, 2011.

(51) Int. Cl.
*G09B 7/06* (2006.01)
*G09B 5/06* (2006.01)
*G09B 19/00* (2006.01)

(52) U.S. Cl.
CPC ............... *G09B 7/06* (2013.01); *G09B 5/06* (2013.01); *G09B 19/003* (2013.01)

(58) Field of Classification Search
CPC ... G09B 7/00; G09B 7/06; G09B 5/00; G09B 5/06; G09B 19/00; G09B 19/003
See application file for complete search history.

(56) References Cited

U.S. PATENT DOCUMENTS

2002/0168621 A1* 11/2002 Cook ...................... G09B 7/00 434/350
2006/0019222 A1* 1/2006 Lelito ..................... G09B 7/02 434/118

* cited by examiner

*Primary Examiner* — Timothy A Musselman
(74) *Attorney, Agent, or Firm* — Snell & Wilmer L.L.P.

(57) ABSTRACT

A virtual-immersion computer that provides webpages to facilitate virtual immersion. The system uses a media-streamer computer processor for broadcasting media comprising a simulation-video stream, an audio stream, a radio-transmission-stream. The media is structured within a web frame of webpages by the processor and an audio frame, a picture frame, and/or a video with audio frame.

20 Claims, 7 Drawing Sheets

VIRTUAL-IMMERSION COMPUTER WEBPAGES

CROSS-REFERENCE TO RELATED APPLICATION

This application is a continuation of, claims priority to and the benefit of, U.S. patent application Ser. No. 14/254,068, filed on Apr. 16, 2014 and entitled "HAZARD-ZONE INCIDENT COMMAND TRAINING AND CERTIFICATION SYSTEMS," which is a continuation of, claims priority to and the benefit of, U.S. patent application Ser. No. 13/103, 856, filed on May 9, 2011 and entitled "HAZARD-ZONE INCIDENT COMMAND TRAINING AND CERTIFICATION SYSTEMS," which claims priority to and the benefit of Provisional Application No. 61/467,354, filed on Mar. 24, 2011 and entitled "HAZARD-ZONE INCIDENT COMMAND TRAINING AND CERTIFICATION SYSTEMS," which claims priority to and the benefit of Provisional Application No. 61/395,277, filed on May 11, 2010 and entitled "BLUE CARD HAZARD ZONE INCIDENT COMMAND TRAINING AND CERTIFICATION PROGRAM," which are hereby incorporated by reference in their entirety for all purposes.

BACKGROUND

This invention relates to improved training and certifying of persons responsible for decision making and management operations as part of an emergency response at incidents that contain at least one hazard zone which contains a hazard that can injure or kill responders or other persons. More particularly, this invention relates to at least improving safety, command procedures and hazard response procedure by at least Command personnel when in an emergency response situation involving at least potential risk of death or injury to responders.

OBJECTS AND FEATURES OF THE INVENTION

A primary object and feature of the present invention is to provide systems and methods overcoming the above-mentioned problem(s).

It is a further object and feature of the present invention to provide such systems and methods relating to training at least one applicant in fire-incident management skills in at least one client-server architecture.

It is a further object and feature of the present invention to provide such systems and methods designed to train and certify persons to act as at least one responsible person (s) (Incident Commander) for decision making and management operations as part of an emergency response at incidents that contain at least one hazard zone; such hazard zone defined as any work area which contains a hazard that can injure or kill, for example, burning structures, hazardous material incidents, roadways with active traffic, natural disaster sites, and/or other emergency response scenes.

It is a further object and feature of the present invention to provide such systems and methods to provide an online Incident-Commander training course.

It is a further object and feature of the present invention to provide such systems and methods for interchange of compensation, education, certification, and information between entities involved in an Incident-Commander Training and Certification Program.

It is a further object and feature of the present invention to provide such systems and methods for an online Incident-Commander Training Course comprising at least nine training modules, eight of which preferably correspond to eight fire-command functions to be performed by an Incident-Commander.

It is a further object and feature of the present invention to provide such systems and methods wherein at least one skill-training sequence provides training to at least one applicant in at least eight fire incident management skills.

It is a further object and feature of the present invention to provide such systems and methods to teach and certify fire-incident management skills selected from at least the following: assumption of command; situation evaluation; communication; deployment management; incident action plan development; incident organization; incident action plan review; termination of command.

It is a further object and feature of the present invention to provide a computer-implemented method, relating to training at least one applicant in fire-incident management skills in at least one client-server architecture, comprising the steps of: providing virtual-immersion to the at least one applicant in at least one tire-incident management situation; and providing management mentoring to the at least one applicant while in such at least one fire-incident management situation to develop at least one fire-incident management skill; wherein such step of providing virtual immersion comprises the step of computer-generating such at least one fire-incident management situation is at least one virtual-immersion computer interface; wherein such step of providing management mentoring comprises the step of computer-generating mentoring in at least one management-mentor computer interface; wherein such step of providing virtual immersion and such step of providing management mentoring provides training to the at least one applicant in such at least one fire-incident management skill using the at least one client-server architecture.

It is a further object and feature of the present invention to provide such systems and methods wherein such computer system provides improved training preceding real-world fire-incident decision-making competency evaluation.

A further primary object and feature of the present invention is to provide such systems and methods that are efficient, inexpensive, and handy. Other objects and features of this invention will become apparent with reference to the following descriptions.

SUMMARY OF THE INVENTION

In accordance with a preferred embodiment hereof, this invention provides a computer system; relating to training at least one applicant in fire-incident management skills in at least one client-server architecture, comprising: at least one virtual-immersion computer interface structured and arranged to provide virtual immersion to the at least one applicant in at least one fire-incident management situation; and, at least one management-mentor computer interface structured and arranged to provide management mentoring to the at least one applicant while in such at least one fire-incident management situation to develop at least one fire-incident management skill; wherein such at least one virtual-immersion computer interface comprises at least one virtual-immersion computer processor structured and arranged to generate such at least one fire-incident management situation in such at least one virtual-immersion computer interface; wherein such at least one management-mentor computer interface comprises at least one management-mentor computer processor structured and arranged to generate mentoring in such at least one management-mentor computer interface; and wherein such computer system provides training to the at least one applicant in such at least one fire-incident management skill using the at least one client-server architecture.

Moreover, it provides such a computer system further comprising at least one sequential situation-navigator computer interface structured and arranged to provide at least one sequential situation-navigation of at least one situation sequence of a plurality of such at least one fire-incident management situations to develop such at least one fire-incident management skill. Additionally, it provides such a computer system further comprising at least one situation-navigator regulator computer processor structured and arranged to regulate navigation by the at least one applicant of such at least one sequential situation-navigation of such plurality of such at least one fire-incident management situations. Also, it provides such a system wherein such at least one situation-navigation regulator computer processor comprises at least one access-grantor computer processor structured and arranged to grant: access, within such at least one situation sequence, to at least one subsequent such at least one fire-incident incident management situation following completion of at least one prior such at least one fire incident management situation.

In addition, it provides such a computer system further comprising at least one sequential skill-training-navigator computer interface structured and arranged to provide at least one sequential skill-navigation of at least one skill-training sequence of a plurality of at least one skill-training segments to develop a plurality of such at least one fire-incident management skills. And, it provides such a computer system wherein such at least one skill-training sequence provides training to the at least one applicant in at least eight of such at least one fire incident management skills. Further, it provides such a computer system wherein such at least one skill-training sequence provides training in at least three of such at least one fire-incident management skills selected from the following: assumption of command; situation evaluation; communication; deployment management; incident action plan development; incident organization; incident, action plan review; termination of command.

Even further, it provides such a computer system further comprising at least one skill-navigation regulator computer processor structured and arranged to regulate navigation by the at least one applicant in such at least one sequential skill-navigation of such plurality of such at least one skill training segments. Moreover, it provides such a computer system wherein such at least one navigation-regulator computer processor comprises at least one access-grantor computer processor structured and arranged to grant access to at least one subsequent such at least one skill-training segment following completion of at least one prior such at least one skill-training segment within such at least one sequence.

Additionally, it provides such a computer system wherein such at least one navigation-regulator computer processor comprises at least one access-revoker computer processor structured and arranged to revoke access to such at least one skill-training segment after at least one expiration period beginning at completion of such at least one skill-training segment. Also, it provides such a computer system wherein such at least one expiration period comprises thirty days. In addition, it provides such a computer system further comprising at least one progress-storer computer processor structured and arranged to store progress of the at least one applicant within each such at least one skill-training segment to permit non-continuous training.

And, it provides such a computer system wherein such at least one navigation-regulator computer processor comprises at least one completion-limiter computer processor structured and arranged to limit completion of such at least one skill-training segment to at least one completion time limit. Further, it provides such a computer system wherein such at least one time limit comprises one year. Even further, it provides such a computer system further comprising at least one question-presenter computer interface structured and arranged to present at least one question to the at least one applicant related to such at least one fire-incident management skill.

Moreover, it provides such a computer system wherein such at least one question-presenter computer interface comprises at least one multiple-choice question-presenter computer interface structured and arranged to present at least one multiple-choice question to the at least one applicant related to such at least one fire-incident management skill. Additionally, it provides such a computer system wherein such at least one question-presenter computer interface comprises at least one select-all-that-apply question-presenter computer interface structured and arranged to present at least one select-all-that-apply question to the at least one applicant related to such at least one fire-incident management skill. Also, it provides such a computer system wherein such at least one question-presenter computer interface comprises at least one response-submitter computer interface structured and arranged to allow submission of at least one response from the at least one applicant related to such at least one question.

In addition, it provides such a computer system wherein such at least one question-presenter computer interface comprises at least one correction-feedback-generator computer processor structured and arranged to generate at least one correction feedback on such at least one response submitted by the at least one applicant related to such at least one question. And, it provides such a computer system wherein such at least one correction-feedback-generator computer processor comprises at least one indicator-generator computer processor structured and arranged to generate at least one indicator of such at least one correction feedback of such at least one response.

Further, it provides such a computer system wherein such at least one indicator comprises: at least one correct-indicator structured and arranged to indicate at least one correct response in such at least response; and at least one incorrect-indicator structured and arranged to indicate at least one incorrect response in such at least response. Even further, it provides such a computer system wherein such at least one indicator comprise at least one text-color change. Moreover, it provides such a computer system wherein such at least one correct-indicator comprises at least one text-color change of green.

Additionally, it provides such a computer system wherein such at least one incorrect-indicator comprises at least one text-color change of red. Also, it provides such a computer system wherein such at least one management-mentoring computer interface further comprises at least one question-mentoring computer interface structured and arranged to provide question mentoring to the at least one applicant relating to such at least one question. In addition, it provides such a computer system further comprising at least one quiz-presenter computer interface structured and arranged to present at least one quiz to the at least one applicant to complete such at least one skill training segment. And, it provides such a computer system wherein such at least one quiz-presenter computer interface comprises at least one quiz-response-submitter computer interface structured and arranged to allow submission of at least one quiz response provided on such at least one quiz.

Further, it provides such a computer system wherein such at least one quiz-presenter computer interface comprises at least one quiz-feedback-generator computer processor structured and arranged to generate at least one quiz-correction feedback on such at least one quiz response submitted by the at least one applicant. Even further, it provides such a computer system wherein such at least one quiz-feedback-generator computer processor comprises at least one quiz-feedback indicator-generator computer processor structured and arranged to generate at least one quiz-feedback indicator of such at least one correction feedback of such at least one quiz response. Moreover, it provides such a computer, system wherein such at least one quiz-feedback indicator comprises: at least one correct-indicator structured and arranged to indicate at least one correct response in such at least response; and at least one incorrect-indicator structured and arranged to indicate at least one incorrect response in such at least response.

Additionally, it provides such a computer system wherein such at least one indicator comprise at least one text color change. Also, it provides such a computer system wherein such at least one correct-indicator comprises at least one text color change of green. In addition, it provides such a computer system wherein such at least one incorrect-indicator comprises at least one text color change of red. And, it provides such a computer system further comprising at least one score-calculator computer processor structured and arranged to calculate at least one score of at least one correct percentage of such at least one quiz response submitted by the at least one applicant. Further, it provides such a computer system wherein completion of such at least one skill-training segment requires at least one minimum of such at least one correct percentage. Even further, it provides such a computer system wherein such at least one minimum comprises seventy-five percent.

Moreover, it provides such a computer system further comprising: at least one completion-record storer computer processor structured and arranged to store at least one record indicating completion by the at least one applicant of all of such at least one skill-training segments; and at least one completion-record retriever computer interface structured and arranged to provide retrieval of such at least one record indicating completion of all of such at least one skill-training segments by the at least one applicant by at least one certification simulation lab provider. Additionally, it provides such a computer system wherein such at least one virtual-immersion computer processor comprises at least one media-streamer computer processor structured and arranged to stream media over the at least one client-server architecture.

Also, it provides such a computer system wherein such at least one media-streamer computer processor streams at least one video stream. In addition, it provides such a computer system wherein such at least one media-streamer computer processor streams at least one simulation-video stream. And, it provides such a computer system wherein such at least one media-streamer computer processor streams at least one audio stream. Further, it provides such a computer system wherein such at least one media-streamer computer processor streams at least one radio-transmission-simulation audio stream. Even further, it provides such a computer system wherein such at least one management-mentor computer processor comprises at least one mentor-media streamer computer processor structured and arranged to stream at least one mentoring media over the at least one client-server architecture.

Moreover, it provides such a computer system wherein such computer system provides improved training preceding real-world fire-incident decision-making competency evaluation. Additionally, it provides such a computer system further comprising at least one text-computer display structured and arranged to display at least one textual content related to training the at least one applicant in such at least one fire-incident management skill. Also, it provides such a computer system further comprising at least one image computer interface structured and arranged to display at least one image representing such at least one fire-incident situation.

In accordance with another preferred embodiment hereof, this invention provides a computer-implemented method, relating to training at least one applicant in fire-incident management skills in at least one client-server architecture, comprising the steps of: providing virtual-immersion to the at least one applicant in at least one fire-incident management situation; and providing management mentoring to the at least one applicant while in such at least one fire-incident management situation to develop at least one fire-incident management skill; wherein such step of providing virtual immersion comprises the step of computer-generating such at least one fire-incident management situation in at least one virtual-immersion computer interface; wherein such step of providing management mentoring comprises the step of computer-generating mentoring in at least one management-mentor computer interface; wherein such step of providing virtual immersion and such step of providing management mentoring provides training to the at least one applicant in such at least one fire-incident management skill using the at least one client-server architecture.

In addition, it provides such a computer-implemented method further comprising the step of providing sequential, situation-navigation of a plurality of such at least one fire-incident management situations to develop such at least one fire-incident management skill. And, it provides such a computer-implemented method further comprising the step of providing sequential skill-training navigation of a plurality of at least one skill-training segments to develop a plurality of such at least one fire-incident management skills in at least one skill sequence. Further, it provides such a computer-implemented method further comprising the step of regulating navigation by the at least one applicant to such sequential skill-navigation of such plurality of such at least one skill-training segments.

Even further, it provides such a computer-implemented method wherein such step of regulating navigation further comprises the step of granting access to at least one subsequent such at least one skill-training segment following completion of at least one prior such at least one skill-training segment within such at least one sequence; The computer-implemented method further comprising the step of storing progress of the at least one applicant within each such at least one skill-training segment to permit non-continuous training. Moreover, it provides such a computer-implemented method further comprising the step of providing at least one question to the at least one applicant related to such at least one fire-incident management skill. Additionally, it provides such a computer-implemented method wherein such step of providing at least one question further comprises the step of allowing submission of at least one response from the at least one applicant related to such at least one question.

Also, it provides such a computer-implemented method wherein such step of providing at least one question further comprises the step of providing at least one correction feedback on such at least one response submitted by the at least one applicant related to such at least one question. In addition, it provides such a computer-implemented method wherein such step of providing management mentoring further comprises the step of providing question mentoring to the at least one applicant relating to such at least one question. And, it provides such a computer-implemented method further comprising the step of providing at least one quiz to the at least one applicant at the end of such at least one skill-training segment.

Further, it provides such a computer-implemented method wherein such step of providing at least quiz further comprises the step of receiving submission of at least one quiz response provided on such at least one quiz. Even further, it provides such a computer-implemented method further comprising the step of calculating at least one correct percentage of such at least one quiz response submitted by the at least one applicant. Moreover, it provides such a computer-implemented method further comprising the steps of: storing at least one record indicating completion by the at least one applicant of all of such at least one skill training segments; and retrieving such at least one record indicating completion status of all of such at least one skill training segments by the at least one applicant, upon request by at least one certification simulation lab provider. Additionally, it provides such a computer-implemented method wherein such computer-implemented method provides improved training preceding real-world fire-incident decision-making competency evaluation.

In accordance with another preferred embodiment hereof, this invention provides a computer system, relating to training at least one applicant in fire incident management skills in at least one client-server architecture, comprising: virtual-immersion computer interface means for providing virtual immersion to the at least one applicant in at least one fire-incident management situation; and management-mentor computer interface means for providing management mentoring to the at least one applicant while in such at least one fire-incident management situation to develop at least one fire-incident management skill; wherein such virtual-immersion computer interface means comprises virtual-immersion computer processor means for generating such at least one fire-incident management situation in such virtual immersion computer interface means; and wherein such management-mentor computer interface means comprises management-mentor computer processor means for generating mentoring in such management-mentor computer interface means; and wherein such computer system provides training to the at least one applicant in such at least one fire incident management skill using the at least one client-server architecture.

Also, it provides such a computer system further comprising sequential situation-navigator computer interface means for providing sequential situation-navigation of a plurality of such at least one fire-incident management situations to develop such at least one fire-incident management skill. In addition, it provides such a computer system further comprising sequential skill-training-navigator computer interface means for providing sequential skill-navigation of a plurality of at least one skill-training segments to develop a plurality of such at least one fire-incident management skills in least one skill sequence. And, it provides such a computer system wherein such computer system provides training to the at least one applicant in at least eight of such at least one fire-incident management skills.

Further, it provides such a computer system further comprising skill-navigation regulator computer processor means for regulating navigation by the at least one applicant to such sequential navigation of such plurality of such at least one skill training segments. Even further, it provides such a computer system wherein such navigation-regulator computer processor means comprises access-grantor computer processor means for granting access to at least one subsequent such at least one skill-training segment following completion of at least one prior such at least one skill-training segment within such at least one sequence.

Moreover, it provides such a computer system wherein such navigation-regulator computer processor means comprises access revoker computer processor means for revoking access to such at least one skill-training segment after at least one expiration period beginning at completion of such at least one skill-training segment. Additionally, it provides such a computer system wherein such navigation-regulator computer processor means comprises completion-limiter computer processor means for limiting completion of such at least one skill-training segment to at least one completion-time limit. Also, it provides such a computer system further comprising progress-storer computer processor means for storing progress of the at least one applicant within each such at least one skill-training segment to permit non-continuous training. In addition, it provides such a computer system further comprising question-presenter computer interface means for presenting at least one question to the at least one applicant related to such at least one fire-incident management skill.

And, it provides such a computer system wherein such question-presenter computer interface means comprises multiple-choice question computer interface means for providing at least one multiple-choice question to the at least one applicant related to such at least one fire-incident management skill.

Further, it provides such a computer system wherein such question-presenter computer interface means comprises select-all-that-apply question computer interface means for providing at least one select all-that-apply question to the at least one applicant related to such at least one fire-incident management skill. Even further, it provides such a computer system wherein such question-presenter computer interface means comprises response-submission computer interface means for allowing submission of at least one response from the at least one applicant related to such at least one question. Even further, provides such a system wherein such question-presenter computer interface means comprises correction-feedback-generator computer processor means for generating at least one correction feedback on such at least one response submitted by the at least one applicant related to such at least one question.

Even further, it provides such a system wherein such correction-feedback-generator computer processor means comprises indicator-generator computer processor means for generating at least one indicator of such at least one correction feedback of such at least one response. Even further, it provides such a system wherein such management-mentoring computer interface means comprises question-mentoring computer interface means for providing question mentoring to the at least one applicant relating to such at least one question. Even further, it provides such a system further comprising quiz-presenter computer interface means for presenting at least one quiz to the at least one applicant at the end of such at least one skill training segment.

Even further, it provides such a system wherein such quiz-presenter computer interlace means comprises quiz-response-submission computer interface means for allowing submission of at least one quiz response provided on such at least one quiz. Even further, it provides such a system wherein such quiz-computer interface means comprises quiz-feedback computer processor means for providing at least one quiz-correction feedback on such at least one quiz response submitted by the at least one applicant. Even further, it provides such a system further comprising score-calculator computer processor means for calculating at least one score of at least one correct percentage of such at least one quiz response submitted by the at least one applicant.

Even further, it provides such a computer system wherein completion of such at least one skill-training segment requires at least one minimum of such at least one correct percentage. Even further it provides such a computer system further comprising: completion-record storer computer processor means fur storing at least one record indicating completion by the at least one applicant of all of such at least one skill training segments; completion-record retriever computer interface means for providing retrieval of such at least one record indicating completion of all of such at least one skill training segments by the at least one applicant by at least one certification simulation lab provider. Even further, it provides such a computer system wherein such virtual-immersion computer processor means comprises media-streamer computer processor means for streaming media over the at least one client-server architecture.

Even further, it provides such a computer system wherein such media-streamer computer processor means streams at least one video stream. Even further, it provides such a computer system wherein such media-streamer computer, processor means streams at least one simulation video stream. Even further, it provides such a computer system wherein such media-streamer computer processor means streams at least one audio stream. Even further, it provides such a computer system wherein such media-streamer computer processor means streams at least one radio-transmission-simulation audio stream. Even further, it provides such a computer system wherein such management-mentor computer processor means comprises mentor media streamer computer processor means for streaming at least one mentoring media.

Even further, it provides such a computer system wherein such computer system provides improved training preceding real-world fire-incident decision-making competency evaluation. Even further, it provides such a computer system further comprising text-computer display means for displaying at least one textual content related to training the at least one applicant in at least one fire incident management skill. Even further, it provides such a computer system further comprising image-computer interface means for displaying at least one image representing at least one fire incident situation.

DETAILED DESCRIPTION OF THE BEST MODES AND PREFERRED EMBODIMENTS OF THE INVENTION

Figure 1:
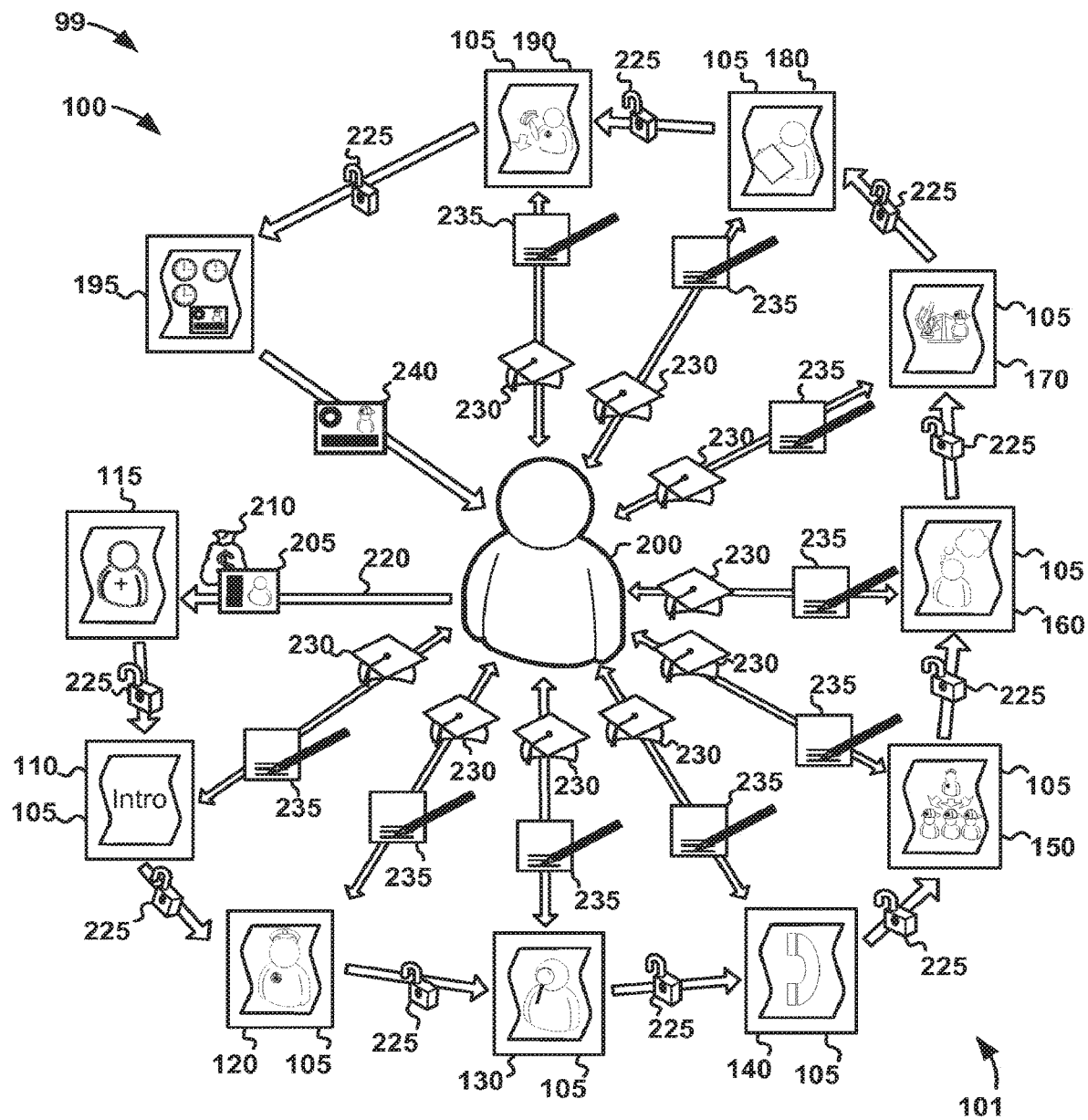
FIG. 1 shows a diagrammatic view, illustrating an Incident Commander Training and Certification Program of the Hazard-Zone Incident Command Training and Certification Systems, according to a preferred embodiment of the present invention.

FIG. 1 shows a diagrammatic view, illustrating Incident Commander Training and Certification Program 100 of the Hazard-Zone Incident Command Training and Certification Systems 99, according to a preferred embodiment of the present invention. Hazard-Zone Incident Command Training and Certification Systems 99 preferably comprises Incident Commander Training and Certification Program 100. Incident Commander Training and Certification Program 100 preferably comprises a program preferably designed to preferably train and preferably certify Users 200 to preferably serve at least in a role of Incident Commander. An Incident Commander is a person who takes responsibility for decision-making and management operations as part of an emergency response incidents that contain a hazard zone. A hazard zone is defined as any work area which contains a hazard that may result in injury or death, particularly to responders. Hazard zones may comprise, for example, burning structures, hazardous material incidents, roadway with active traffic, natural disaster sites, or other emergency response scenes. Trained persons serving the role of Incident Commander assume command and manage hazard-zone operations. As Incident Commander, a person preferably should possess the ability to evaluate an incident scene containing a hazard zone, to effectively communicate and to manage resource deployment, and to develop an Incident Action Plan. As part of training Users 200 for the role of Incident Commander, Incident Commander Training and Certification Program 100 preferably teaches Users 200 at least one set of skills required to serve as Incident Commander in incidents containing a hazard zone. Incident Commander Training and Certification Program 100 preferably is focused on preparing Users 200 to serve as Incident Commanders in hazard zone situations preferably comprising fire-incidents involving burning structures Users 200 of Incident Commander Training and Certification Program 100 preferably comprise fire department personnel seeking to serve the role of Incident Commander. Upon reading this specification, those with ordinary skill in the art will now appreciate that, under appropriate circumstances, considering such issues as program design preference, use preferences, cost, changing needs for emergency personnel, etc., other users such as, for example, lacy enforcement personnel, military personnel, hospital staff, emergency response volunteers, members of emergency response organizations, other emergency support personnel, etc., may suffice.

Incident Commander Training and Certification Program 100 preferably comprises at least forty hours of online command training preferably combined with a certification simulation program (see further details below). In addition, since Incident Commander Training and Certification Program 100 is a certification program, Users 200 who have completed the program preferably are required to participate in yearly continuing education and preferably are required to undergo re-certification at least every three years. Upon reading this specification, those with ordinary skill in the art will now appreciate that, under appropriate circumstances, considering such issues as program design preference, user preferences, cost, changing training and certification requirements, etc., other training and certification arrangements such as, for example, more required hours of study, fewer required hours of study, different continuing education requirements, other recertification requirements, etc., may suffice.

Incident Commander Training and Certification Program 100 preferably comprises at least one Online Incident Commander Training Course 101 which preferably comprises at least one online training segment. Online Incident Commander Training Course 101 preferably is hosted by Server Environment 102 (see FIG. 2). Incident Commander Training and Certification Program 100 preferably further comprises at least one Certification Simulation 195 which preferably comprises a three day simulation lab, as shown (see further details below). Certification Simulation 195 preferably comprises at least one real-world training lab in which Users 200 preferably attend live seminars and preferably engage in hands-on training in order to preferably apply and preferably further enhance skills learned during Online Incident Commander Training Course 101 (this arrangement at least herein embodying wherein such computer system provides improved training preceding real-world fire-incident decision-making competency evaluation). Upon reading this specification, those with ordinary skill in the art will now appreciate that, under appropriate circumstances, considering such issues as design preference, user preferences, cost, future technologies, etc., other training arrangements such as, for example, online simulation labs, virtual simulation labs, entirely seminar-based simulation labs, entirely online training programs, etc., may suffice.

Online Incident Commander Training Course 101 preferably comprises at least nine Training Modules 105, as shown in FIG. 1, eight of which preferably correspond to eight preferred fire command functions performed by an Incident Commander (this arrangement at least herein embodying wherein such at least one skill-training sequence provides training to the at least one applicant in at least eight of such at least one fire-incident management skills). Each of the eight fire command functions preferably correspond to at least one commending skill or job function performed by an Incident Commander. Training Modules 105 preferably comprise at least one Introductory Module 110, at least one Assumption of Command Module 120, at least one Situation Evaluation Module 130, at least one Communications Module 140, at least one Deployment Management Module 150, at least one Develop Incident Action Plan Module 160, at least one Incident Organization Module 170, at least one Review Incident Action Plan Module 180, and at least one Terminate Command Module 190, as shown in FIG. 1. Upon reading this specification, those with ordinary skill in the art will now appreciate that, under appropriate circumstances, considering such issues as program design preference, user preferences, marketing preferences, cost, changing training and certification requirements, etc., other training module arrangements such as, for example, incorporation of additional training modules with additional content, combining material into fewer training modules, more or fewer training modules, etc., may suffice.

Each Training Module 105 preferably comprises a series of WebPages 700 (see FIG. 7), preferably between about forty to about two hundred WebPages 700. Upon reading this specification, those with ordinary skill in the art will now appreciate that, under appropriate circumstances, considering such issues as program design preference, user preferences, cost, changing training and certification requirements, etc., other arrangements such as, for example, fewer WebPages per training module, more WebPages per training module, etc., may suffice.

Training Modules 105 of Online Incident Commander Training Course 101 preferably comprises media content preferably designed to simulate structure fire hazards or other hazard zone situations in order to train Users 200 in at least one fire command function (see further details below). This arrangement at least embodies herein virtual-immersion computer interface means for providing virtual immersion to the at least one applicant in at least one fire-incident management situation; and, this arrangement at least embodies herein at least one virtual-immersion computer interface structured and arranged to provide virtual immersion to the at least one applicant in at least one fire-incident management situation; and, this arrangement at least embodies herein providing virtual-immersion to the at least one applicant in at least one fire-incident management situation.

Each Training Module 105 preferably provides Educational Information 230, preferably related to one of the preferably eight fire command functions, and preferably permits User 200 to input Responses 235, as shown in FIG. 1. Responses 235 preferably comprise answers submitted to multiple-choice questions, "select all that apply" questions, and quiz questions (see details below).

Upon reading this specification, those with ordinary skill in the art will now appreciate that, under appropriate circumstances, considering such issues as design preference, user preferences, marketing preferences, cost, structural requirements, available materials, technological advances, etc., other Response 235 arrangements such as, for example, written testing, essay responses, verbal response, image response, etc., may suffice.

Online Incident Commander Training Course 101 preferably requires User 200 to preferably view and preferably complete each Training Module 105 in its entirety before at least one subsequent Training Module 105 is "unlocked" according to Unlocking Step 225, as shown. The above arrangement preferably ensures that User 200 receives training in preferably eight fire command functions preferably sequentially in a preferably pre-determined sequence. This arrangement at least embodies herein sequential skill-training-navigator computer interface means for providing sequential skill-navigation of a plurality of at least one skill-training segments to develop a plurality of such at least one fire-incident management skills in at least one skill sequence; and, this arrangement at least embodies herein at least one sequential skill-training-navigator computer interface structured and arranged to provide at least one sequential skill-navigation of at least one skill-training sequence of a plurality of at least one skill-training segments to develop a plurality of such at least one fire-incident management skills; and, this arrangement at least herein embodies providing sequential skill-training navigation of a plurality of at least one skill-training segments to develop a plurality of such at least one fire-incident management skills in at least one skill sequence.

Figure 4:
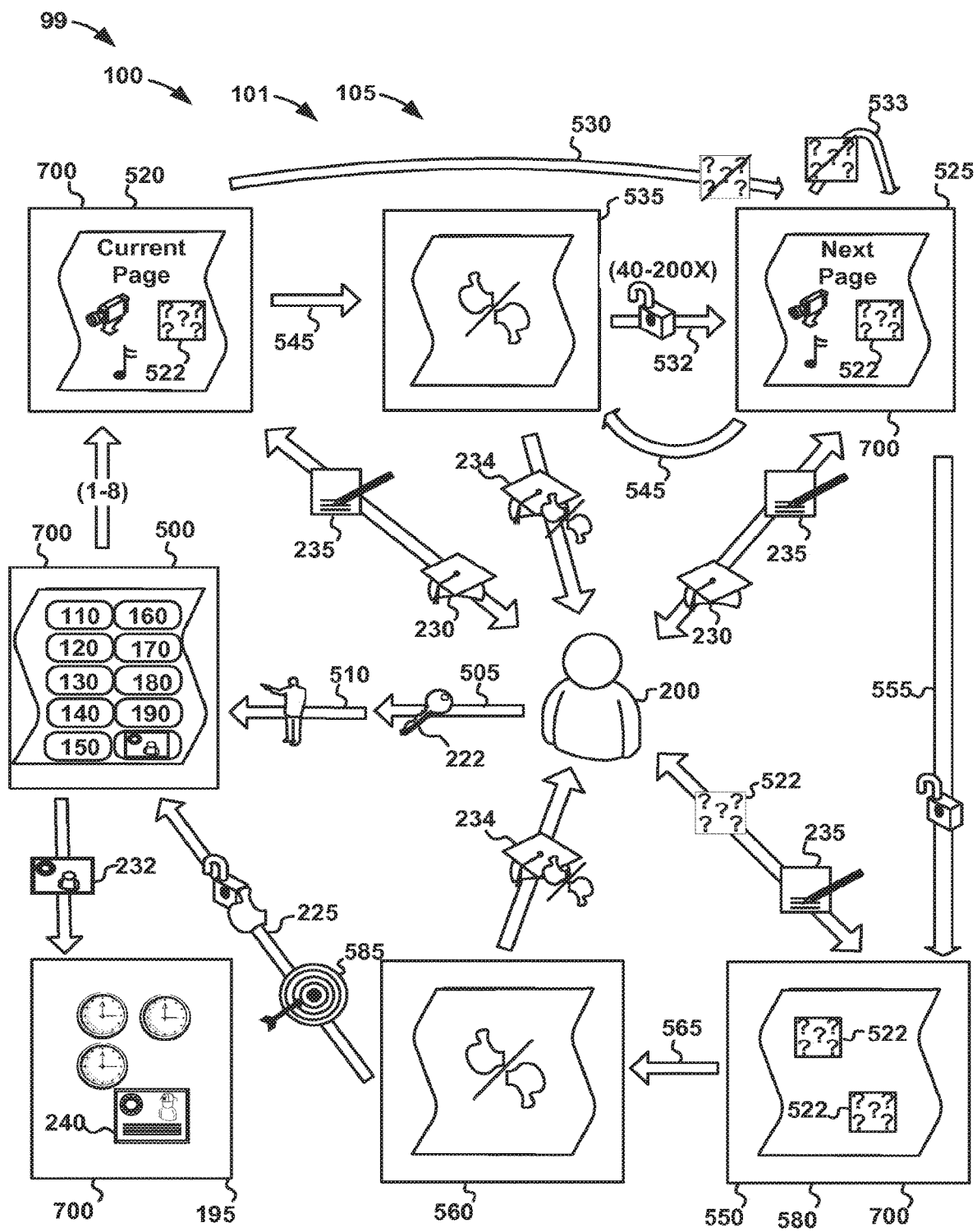
FIG. 4 shows a diagrammatic view, illustrating the navigation path followed by a User through the Online Incident Commander Training Course of the Incident Commander Training and Certification Program, according to the preferred embodiment of FIG. 1.
Figure 5:
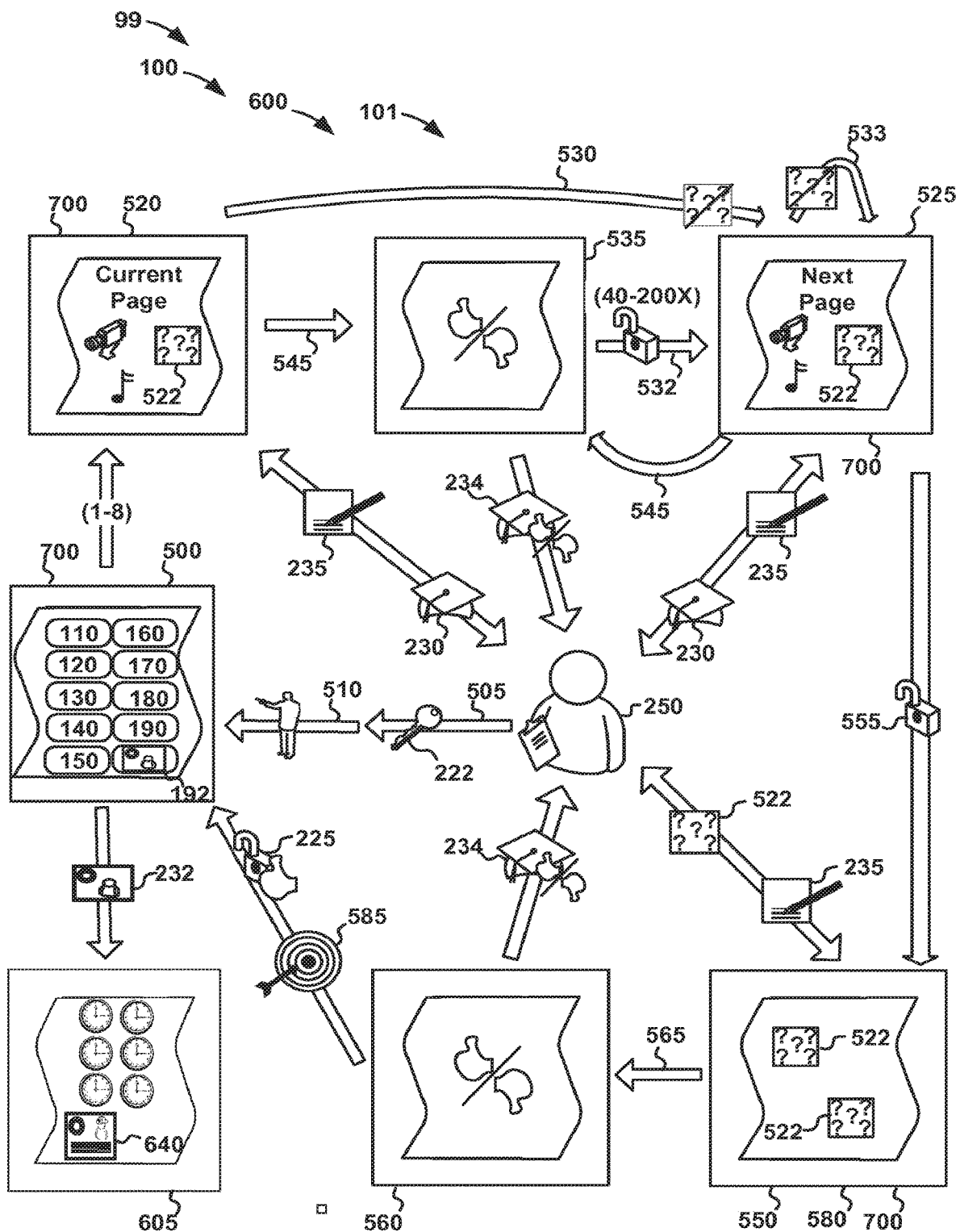
FIG. 5 shows a diagrammatic view, illustrating the navigation path followed by a Trainer User through the Online Incident Commander Training Course as part of the Incident Commander Train-the-Trainer Program of the Hazard-Zone Incident Command Training and Certification Systems, according to another preferred embodiment of the present invention.

Each Training Module 105 preferably ends with at least one Quiz Section 580 (see FIG. 4 and FIG. 5). Quiz Section 580 preferably comprises the only graded and scored section of Online Incident Commander Training Course 101. Upon reading this specification, those with ordinary skill in the art will now appreciate that, under appropriate circumstances, considering such issues as program design preference, user preferences, changing training and certification requirements, etc., other testing arrangements such as, for example, grading of all questions throughout the online course, grading of a single test at the end of the entire online course, grading of a single test at the end of the entire training program, incorporation of more graded quiz sections, etc., may suffice.

Users 200 preferably are required to complete each Quiz Section 580 (see FIG. 4 and FIG. 5) before advancing to the next Training Module 105, according to Unlocking Step 225, as shown. Access to completed Training Modules 105 by Users 200 preferably expires thirty days after completion (this arrangement at least herein embodying wherein such navigation-regulator computer processor means comprises access revoker computer processor means for revoking access to such at least one skill-training segment after at least one expiration period beginning at completion of such at least one skill-training segment; and, this arrangement at least herein embodying wherein such at least one navigation-regulator computer processor comprises at least one access-revoker computer processor structured and arranged to revoke access to such at least one skill-training segment after at least one expiration period beginning at completion of such at least one skill-training segment). Upon reading this specification, those with ordinary skill in the art will now appreciate that, under appropriate circumstances, considering such issues as program design preference, user preferences, cost, changing training and certification requirements, etc., other access expiration arrangements, such as, for example, unlimited access, shorter term expiration dates, longer term expiration dates, etc., may suffice.

Upon successful completion of all Training Modules 105 of Online Incident Commander Training Course 101, Users 200 preferably will be permitted to participate in Certification Simulation 195, as shown. Certification Simulation 195 preferably comprises a three day practical training lab in which Users 200 preferably will participate in both hands-on training and attend seminars. Upon reading this specification, those with ordinary skill in the art will now appreciate that, under appropriate circumstances, considering such issues as program design preference, user preferences, cost, changing training and certification requirement, future technologies, etc., other simulation lab arrangements, such as, for example, entirely online simulation labs, virtual simulation labs, simulation software programs, etc., may suffice.

Upon successful completion of Certification Simulation 195, Users 200 preferably receive Incident Commander Certification 240, as shown. Incident Commander Certification 240 preferably entitles Users 200 to serve the role of Incident Commander.

As shown in FIG. 1, User 200 preferably Is permitted access to Training Modules 105 after preferably performing Registration Step 220, as shown. Registration Step 220 preferably comprises permitting user input of User Identification Information 205 and permitting Users 200 to preferably establish at least one username-password combination 222 (see FIG. 4), as shown. Registration Step 220 preferably is performed at Registration Page 115, as shown. In addition, Users 200 preferably provide User Compensation 210 during Registration Step 220, as shown. User Identification Information 205 preferably comprises name, username-password combination, email address, fire department, rank, and years of experience. Upon reading this specification, those with ordinary skill in the art will now appreciate that, under appropriate circumstances, considering such issues as program design preference, user preferences, cost, changing training and certification requirements, etc., other identification information, such as, for example, badge number, identification number, driver's license number, home address, other professional affiliation specifications, volunteer organization, etc., may suffice.

Upon successful completion of Registration Step 220, Introductory Module 110 preferably is "unlocked" for viewing according to Unlocking Step 225, permitting User 200 to view and navigate through Introductory Module 110, as shown. Introductory Module 110 preferably provides an overview describing the role and attributes of an effective Incident Commander, and preferably provides an overview of preferably at least eight standard fire command functions performed by an Incident Commander at an emergency response scene.

Upon completion of Introductory Module 110, User 200 preferably gains access to Assumption of Command Module 120 according to Unlocking Step 225, as shown, preferably allowing User 200 to navigate through a series of WebPages 700 (see FIG. 7) comprising Assumption of Command Module 120. While participating in Assumption of Command Module 120, User 200 preferably is at least mentored on how to assume and quickly establish command, as well as how to manage ongoing command in emergency response situations.

Upon completion of Assumption of Command Module 120 by User 200, User 200 preferably gains access to Situation Evaluation Module 130 according to Unlocking Step 225, a shown, preferably allowing User 200 to navigate through a series of Webpages 700 comprising Situation Evaluation Module 130. While participating in Situation Evaluation Module 130, User 200 preferably is at least mentored on how to properly evaluate incident conditions using vision, maps, pre-plans, reference materials, and time measuring.

Upon completion of Situation Evaluation Module 130 by User 200, User 200 preferably gains access to Communications Module 140 according to Unlocking Step 225, as shown, preferably allowing User 200 to navigate through a series of WebPages 700 comprising Communications Module 140. While participating in Communications Module 140, User 200 preferably least mentored on standard operating procedures for effective communication such as proper use of radio communications, critical listening, and coordinating timely progress reports.

Upon completion of Communications Module 140 by User 200, User 200 preferably gains access to Deployment Management Module 150 according to Unlocking Step 225, as shown, preferably allowing User 200 to navigate through a series of WebPages 700 comprising Deployment Management Module 150. While participating in Deployment Management Module 150, User 200 preferably is at least mentored on how to dispatch resources, how to maintain accountability of on-scene resources, and how to manage the work/rest cycle of all resources employed in the hazard zone site.

Upon completion of Deployment Management Module 150 by User 200, User 200 preferably gains access to Develop Incident Accident Plan Module 160 according to Unlocking Step 225, as shown, preferably allowing User 200 to navigate through a series of WebPages 700 comprising Develop Incident Action Plan Module 160. While participating in Develop Incident Action Plan Module 160, User 200 preferably is at least mentored on how to develop an incident action plan strategy and how to manage and control operations within the incident action plan strategy.

Upon completion of Develop Incident Action Plan Module 160 by User 200, User 200 preferably gains access to Incident Organization Module 170 according to Unlocking Step 225, as shown, preferably allowing User 200 to navigate through a series of WebPages 700 comprising Incident Organization Module 170. While participating in Incident Organization Module 170, User 200 preferably is at least mentored on hew to develop incident organization how to keep resources connected, how to effectively delegate control of management, and how to build an effective command team.

Upon completion of Incident Organization Module 170 by User 200, User 200 preferably gains access to Review Incident Action Plan Module 180 according to Unlocking Step 225, as shown, preferably allowing User 200 to navigate through a series of WebPages 700 comprising Incident Action Plan Module 180. While participating in Incident Action Plan Module 180, User 200 preferably is at least mentored on how to carry out fire command functions in standard order, how to receive, confirm and evaluate conditions, and how to use incident action plan strategy as a checklist for revisions.

Upon successful completion of Review Incident Action Plan Module 180 by User 200, User 200 preferably gains access to Terminate Command Module 190 according to Unlocking Step 225, as shown, preferably allowing User 200 to navigate through a series of WebPages 700 preferably comprising Terminate Command Module 190. While participating in Terminate Command Module 190, User 200 preferably is at least mentored on how to estimate the length of command required, how to consider time and resources needed for completion of each tactical priority, how to provide rehabilitation, rotation, and relief for command staff, how to reduce the command structure at ending stages of the incident, and how to provide post-incident review with hazard zone workers.

Upon successful completion of Terminate Command Module 190, User 200 preferably is permitted to participate in Certification Simulation 195 according to Unlocking Step 225, as shown. Certification Simulation 195 preferably comprises a three-day simulation lab in which Users 200 preferably attend seminars and participate in hands-on training. Upon reading this specification, those with ordinary skill in the art will now appreciate that, under appropriate circumstances, considering such issues as program design preference, user preferences, cost, changing training and certification requirements, etc., other simulation lab requirements, such as, for example, more required days, fewer required days, etc., may suffice.

Upon successful completion of Online Incident Commander Training Course 101 and Certification Simulation 195, User 200 preferably obtains at least one Incident Commander Certification 240, as shown in FIG. 1.

According to another preferred embodiment of the present invention, Incident Commander Training and Certification Program 100 preferably comprises Incident Commander Train-the-Trainer Program 600 (see FIG. 5). Incident Commander Train-the-Trainer Program 600 preferably comprises a curriculum tailored for Trainer Users 250 (see FIG. 5). Trainer Users 250 preferably comprise individuals who are senior members of a fire department's operations, training, and safety divisions. Incident Commander Train-the-Trainer Program 600 preferably is designed to train and certify Trainer Users 250 to preferably train and preferably certify other members of their home department or community to serve as Incident Commanders according to the curriculum provided by Incident Commander Training and Certification Program 100. Incident Commander Train-the-Trainer Program 100 preferably allows Trainer Users 250 to take Incident Commander Training and Certification Program 100 back to their home departments and preferably train and certify other members of their department or community. A major objective of incident Commander Train-the-Trainer Program 600 preferably is to allow individuals to customize the Incident Commander Training and Certification Program 100 according to the needs of their respective local departments, preferably at a fraction of the cost it would take a fire department to produce and develop a training program alone. Factors which $^{may,}$ influence varying needs of different departments or regions include local topography, varying resource levels, and varying standard operating procedures.

To be eligible for Incident Commander Train-the-Trainer Program 600, Trainer Users 250 preferably are required to have at least five years fire service experience. Upon reading this specification, those with ordinary skill in the art will now appreciate that, under appropriate circumstances, considering such issues as program design preference, user preferences, cost, changing needs, etc., other experience levels, such as, for example, more years of experience, fewer years of experience, etc., may suffice.

Positions preferably held by Trainer Users 250 preferably comprise Department Training Officer, Response Chief, Ranking Operations Chief, Shift Commander, or District Chief. Upon reading this specification, those with ordinary skill in the art will now appreciate that, under appropriate circumstances, considering such issues as program design preference, user preferences, cost, changing needs, etc., other positions, such as, for example, Department Lieutenant, Department Captain, Department Senior Captain, Department Battalion Chief, other emergency response team leaders, etc., may suffice.

Participation by Trainer Users 250 in Incident Commander Train-the-Trainer Program 600 preferably first requires Trainer Users 250 to successfully complete Online Incident Commander Training Course 101 (see FIG. 5). Successful completion of Online Incident Commander Training Course 101 preferably permits Trainer Users 250 to participate in Trainer Certification Simulation 605 (see FIG. 5). Trainer Certification Simulation 605 preferably comprises six consecutive eight-hour days of seminar-based and hands-on training in which Trainer Users 250 preferably learn teaching and evaluation criteria necessary to preferably train and preferably certify other students to preferably serve the role of Incident Commander. Trainer Certification Simulation 605 preferably also comprises a three-day curriculum of Certification Simulation 195 (see FIG. 4). Upon reading this specification, those with ordinary skill in the art will now appreciate that, under appropriate circumstances, considering such issues as program design preference, user preferences, cost, changing training and certification requirements, future technologies, etc., other simulation training arrangements, such as, for example, entirely online simulation training, virtual simulation training, seminar-based simulation training, software based simulation training, etc., may suffice.

Upon completion of Trainer Certification Simulation 605, Trainer Users 250 preferably receive Trainer Certification 640 (see FIG. 5) preferably authorizing Trainer Users 250 to preferably train and preferably certify other Students 650 (see FIG. 2) to serve the role of Incident Commander (see below).

According to another preferred embodiment of the present invention, the curriculum of Incident Commander Train-the-Trainer Program 600 preferably requires Trainer Users 250 to preferably complete both Online Incident Commander Training Course 101 and a three day Certification Simulation 195 (see FIG. 1) before participating in a four day certification simulation program specifically tailored for Trainer Users 250.

Figure 2:
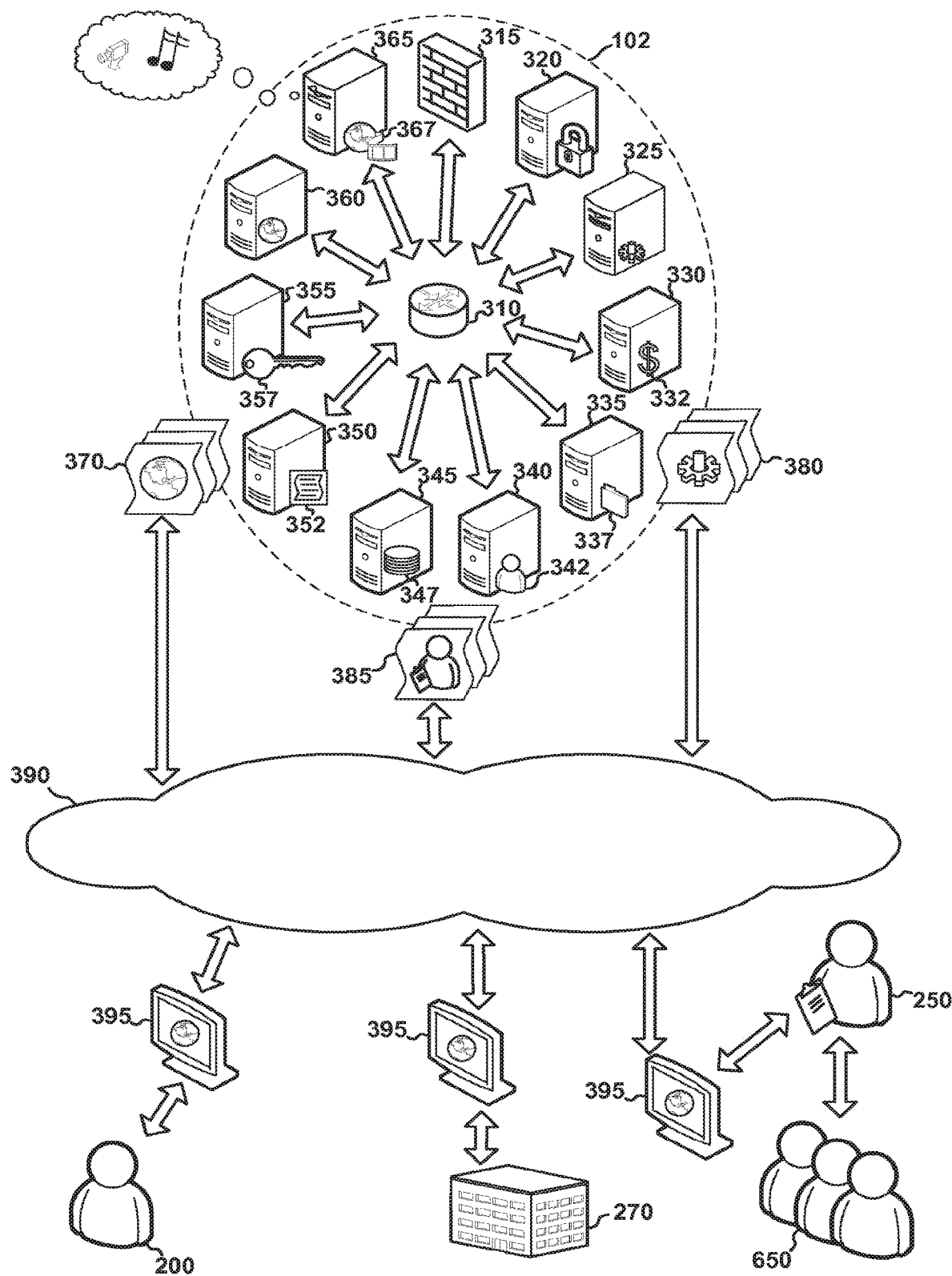
FIG. 2 shows a diagrammatic view, illustrating connectivity among entities involved in the Incident Commander Training and Certification Program, according to the preferred embodiment of FIG. 1.

FIG. 2 shows a diagrammatic view, illustrating connectivity among entities involved in Incident Commander Training and Certification Program 100, according to the preferred embodiment of FIG. 1. Server Environment 102, as shown in FIG. 2, preferably provides services necessary to accomplish the objectives of Online Incident Commander Training Course 101. Server Environment 102 preferably communicates with Users 200, Trainer Users 250, and Program Provider 270 through Internet 390, as shown. Program Provider 270 preferably represents at least one business organization responsible for developing, marketing, and providing services related to Incident Commander Training and Certification Program 100. Program Provider 270 preferably further comprises all personnel serving administrative functions related to services provided by Incident Commander Training and Certification Program 100.

It is noted here that all of the connectivity arrangements between User 200 and Server Environment 102 described in the following paragraphs also describe the connectivity arrangements between Trainer User 250 and Server Environment 102.

Server Environment 102 preferably comprises at least one Communications Router 310, at least one Firewall 315, at least one Content Regulation Server 320, at least one Administration Server 325, at least one Merchant Account Server 330, at least one File Server 335, at least one User-Profile Server 340, at least one Database Server 345, at least one Testing Server 350, at least one Authentication Rights Server 355, at least one User Interface Server 360, and at least one Media Server 365, as shown in FIG. 2.

Communications Router 310 preferably provides internal communication connectivity between servers of Server Environment 102, as shown in FIG. 2. Firewall 315 preferably provides external communication between Server Environment 102 and Internet 390, and thereby between Server Environment 102 and Users 200, Trainer Users 250, and Program Provider 270, as shown. Firewall 315 preferably protects Server Environment 102 from external intrusions.

User-Profile Server 340 preferably maintains User-Profile Information 342, as shown. User-Profile Information 342 preferably corresponds to user-specific information preferably related to User 200, alternately preferably to Trainer User 250. User-Profile Information 342 preferably comprises at least one user-specific username-password combination 222 (see FIG. 4), preferably provided by User 200 to preferably authenticate User 200 access to Server Environment 102. Username-password combination 222 preferably is established during Registration Step 220, as shown in FIG. 1. Once authenticated, User 200 preferably receives permissions 357 to access Server Environment 102 from Authentication Rights Server 355, as shown.

Figure 3:
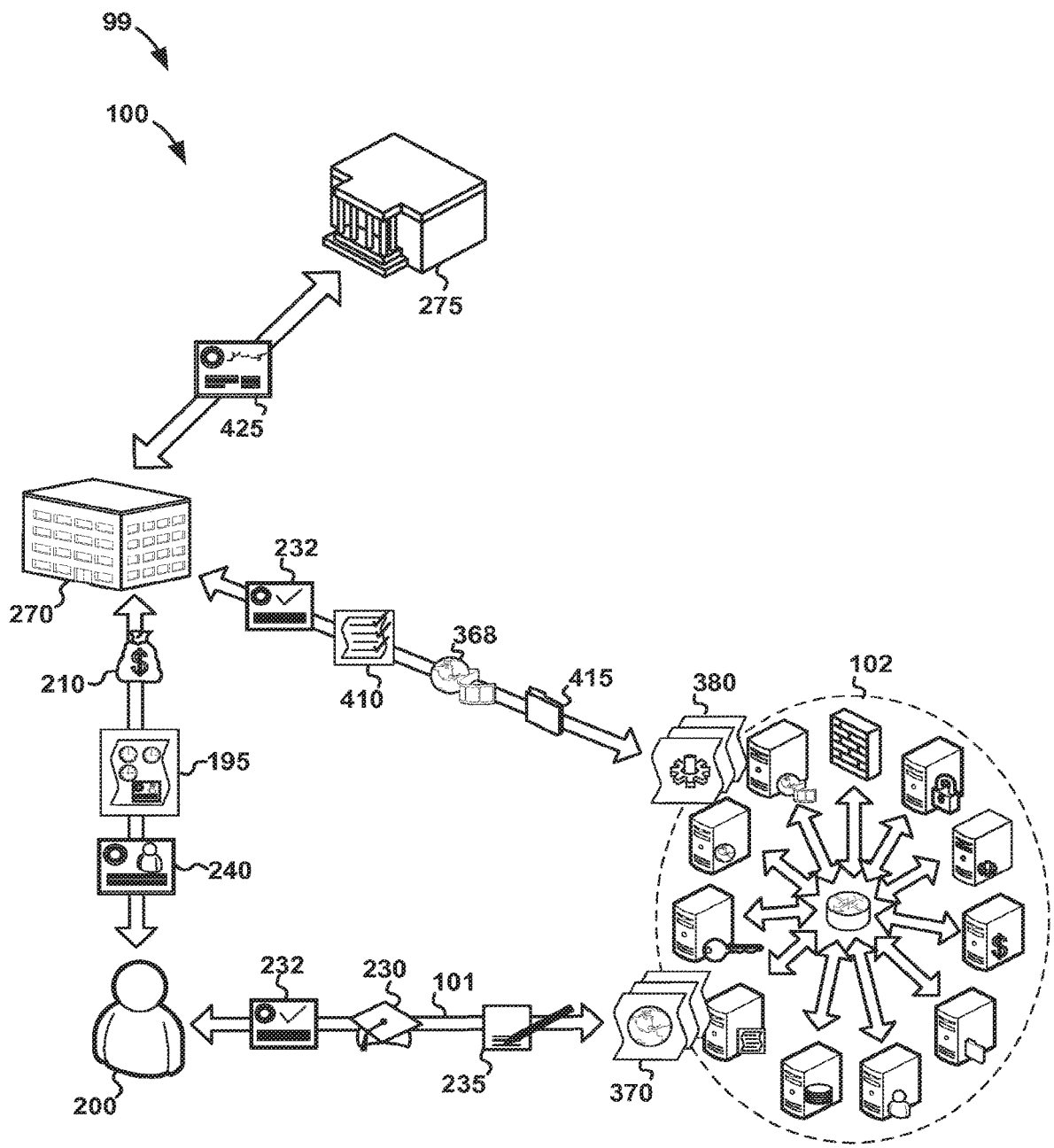
FIG. 3 shows a business flow chart view, illustrating the interchange of compensation, education, certification, and information between entities involved in the Incident Commander Training and Certification Program, according to the preferred embodiment of FIG. 2.

In addition, User-Profile Information 342, maintained by User-Profile Server 340, preferably comprises user-specific progress status information, preferably comprising user-specific Quiz Scores 410 (see FIG. 3). User-specific progress status information preferably specifies which Training Modules 105 have been successfully completed by User 200, preferably at the point of User Login Step 505 (see FIG. 4 and FIG. 5). This above described arrangement preferably allows Users 200 to preferably resume navigation through Online Incident Commander Training Course 101, according to the steps illustrated in FIG. 1, logging out of the system for some time. This arrangement at least embodies herein progress-storer computer processor means for storing progress of the at least one applicant within each such at least one skill-training segment to permit non-continuous training; and, this arrangement at least embodies herein at least one progress-storer computer processor structured and arranged to store progress of the at least one applicant within each such at least one skill-training segment to permit non-continuous training; and, this arrangement at least embodies herein storing progress of the at least one applicant within each such at least one skill-training segment to permit non-continuous training.

In addition, User-Profile Server 340 preferably stores Online Portion Certification 232 (See FIG. 1) in correlation with User-Profile Information 342 when User 200 has successfully completed Online incident Commander Training Course 101. This arrangement at least embodies herein completion-record storer computer processor means for storing at least one record indicating completion by the at least one applicant of all of such at least one skill training segments; and, this arrangement at least embodies herein a least one completion-record store computer processor structured and arranged to store at least one record indicating completion by the at least one applicant of all of such at least one skill-training segments; and this arrangement at least embodies herein storing at least one record indicating completion by the at least one applicant of all of such at least one skill training segments.

In addition, User-Profile Information 342 preferably comprises the date which User 200 completed each Training Module 105, according to Unlocking Step 225, in order, to preferably deny access to a particular Training Module 105 thirty days after completion by User 200. In addition, User-Profile Information 342, maintained by User-Profile Server 340, preferably further comprises at least one user-specific registration date, preferably corresponding to the date on which Registration Step 220 (see FIG. 1) was completed. If User 200 does not complete Online Incident Commander Training Course 101 within one-year from such user-specific registration date, Permissions 357 to access Server Environment 102 preferably will be denied. (this arrangement at least herein embodying wherein such navigation-regulator computer processor means comprises, completion-limiter computer processor means for limiting completion of such at least one skill-training segment to at least one completion-time limit; and, this arrangement at least herein embodying wherein such at least one navigation-regulator computer processor comprises at least one completion-limiter computer processor structured and arranged to limit completion of such at least one skill-training segment to at least one completion time limit).

User-Profile Information 342 preferably further comprises user-specific payment information related to User Compensation 210, Which preferably specifies whether or not User 200 has provided adequate funds to participate in Online Incident Commander Training Course 101.

Preferably, user-specific progress status information, user-specific dates in which each Training Module 105 was completed, user-specific registration dates, and user-specific payment information preferably are directly correlated with user-specific username-password combination 222 by User-Profile Server 340. This arrangement preferably notifies Server Environment 102 which content is appropriate to display to User 200 upon entry of username-password combination 222 at the point of User Login Step 505 (see FIG. 4). For example, if User 200 attempts to access Server Environment 102 by logging into the system more than one-year after their registration date, such information preferably correlated with username-password combination 222, preferably is communicated to Authentication Server 355 in order to deny permissions 357 to access Server Environment 102. As a further example, if User 200 performs User Login Step 505 more than thirty days after completing a particular Training Module 105, User-Profile Server 340 preferably communicates User-Profile Information 342 to Content Regulation Server 320 (see below) in order to preferably deny access to the completed Training Module 105.

Merchant Account Server 330 preferably processes payments 332 related to User Compensation 210 (see FIG. 1), provided by User 200 to access the services provided by Server Environment 102. Merchant Account Server 330 preferably stores payment records related to User Compensation 210 provided by User 200.

Content Regulation Server 320 preferably regulates content available for viewing by Users 200 according to User-Profile Information 342. Content Regulation Server 320 (at least embodying herein skill-navigation regulator computer processor means for regulating navigation by the at least one applicant to such sequential navigation of such plurality of such at least one skill training segments; and, at least embodying herein at least one skill-navigation regulator computer processor structured and arranged to regulate navigation by the at least one applicant in such at least one sequential skill-navigation of such plurality of such at least one skill training segments; and, at least embodying herein regulating navigation by the at least one applicant to such sequential skill-navigation of such plurality of such at least one skill-training segments) preferably is responsible for controlling Unlocking Step 225 to preferably provide User 200 access at least one subsequent Training Modules 105 following completion of at least one prior Training Module 105 (see FIG. 1). Content Regulation Server 320 preferably is further responsible for controlling Page Advancement Step 530 and Page Advancement Step 532 to provide User 200 access to at least one subsequent WebPage 700 following completion of at least one prior WebPage 700 within at least one Training Module 105 (see FIG. 4 and FIG. 5).

Content Regulation Server 320 preferably communicates with User-Profile Server 340 to preferably obtain user-specific progress status information, preferably including user-specific Quiz Scores 410, in order to preferably determine which Training Modules 105 to make accessible to User 200, preferably at the stage of User Login Step 505. When User 200 successfully completes at least one Training Module 105, User-Profile Information 342 preferably is updated and Content Regulation Server 320 preferably "unlocks" at least one subsequent according to Unlocking Step 225 (at least herein embodying wherein navigation-regulator computer processor means comprises access-grantor computer processor means for granting access to at least one subsequent such at least one skill-training segment following completion of at least one prior such at least one skill-training segment within such at least one sequence; and, at least herein embodying wherein such at least one navigation-regulator computer, processor comprises at least one access-grantor computer processor structured and arranged to grant access to at least one subsequent such at least one skill-training segment following completion of at least one prior such at least one skill-training segment within such a least one sequence; and, at least herein embodying wherein such step of regulating navigation further comprises the step of granting access to at least one subsequent such at least one skill-training segment following completion of at least one prior such at least one skill-training segment within such at least one sequence), as shown in FIG. 1.

User-Interface Server 360 preferably comprises at least one User Interface 370, as shown. User interface 370 preferably provides an interface for Users 200 (or Trainer Users 250) to access Online Incident Commander Training Course 101. Content displayed at User Interface 370 preferably is controlled by Content Regulation Server 320, as discussed above. User Interface 370 Preferably permits User 200 to participate in Online Incident Commander Training Course 101 and preferably alter User Profile Information 342. User 200 preferably accesses User Interface 370 preferably using at least one Internet-Enabled Computerized Device 395, as shown. Internet-Enabled Computerized Device 395 preferably comprises at least one personal computer (PC), alternately preferably at least one internet enabled phone, alternately preferably at least one mobile internet-enabled device, alternately preferably at least one hand-held internet-enable device.

User-Interface Server 360 preferably further comprises at least one Trainer Support Interface 385 preferably only accessible by Trainer Users 250 who have successfully completed Incident Commander Train-the-Trainer Program 600 (see below). Trainer Support Interface 385 preferably comprises an interface through which Trainer User 250 may download Additional Training Tools 645 (see FIG. 6) after successful completion of Incident Commander Train-the-Trainer Program 600 (see further details below). Trainer User 250 preferably accesses Trainer Support Interface 385 preferably using at least one Internet-Enable Computerized Device 395, as shown. Internet-Enabled Computerized Device 395 preferably comprises at least one personal computer (PC), alternately preferably at least one Internet enabled phone, alternately preferably at least one mobile internet-enabled device, alternately preferably at least one hand-held internet-enable device.

Database Server 345 preferably comprises at least one Database 347, as shown. Database 347 preferably stores information relating to course content including information, questions, answers, and graphical data preferably used as teaching tools in Online Incident Commander Training Course 101. In addition, Database 347 preferably stores questions and answers related to multiple choice questions, "select all that apply" questions, and quiz questions (see below). Database Server 345 preferably communicates with User Interface Server 360 in order to preferably feed content to User 200 during each Training Module 105. Such content preferably is displayed to User 200 at User Interface 370, as shown.

Testing Server 350 preferably generates Tests 352, as shown. Tests 352 preferably are displayed to User 200 at User Interface 370, as shown. Tests 352 preferably comprise multiple choice questions, "select all that apply" questions, and quiz questions (see below). Testing Server 350 preferably interacts with Database Server 345 to preferably obtain questions for Tests 352 for display at User Interface 370. In addition, Testing Server 350 (at least embodying herein score-calculator computer processor means for calculating at least one score of at least one correct percentage of such at least one quiz response submitted by the at least one applicant; and at least embodying herein at least one score-calculator computer processor structured and arranged to calculate at least one score of at least one correct percentage of such at least one quiz response submitted by the at least one applicant) preferably scores Quiz Sections 580 (see FIG. 4 and FIG. 5) at the end of each Training Module 105 according to the percentage of correct Responses 235 submitted on Quiz Section 580. Testing Server 350 preferably calculates the correct percentage of submitted Responses 235 on Quiz Section 580 according to answers stored in Database Server 345 (this arrangement at least embodying herein calculating at least one correct percentage of such at least one quiz response submitted by the at least one applicant). In addition, Testing Server 350 preferably communicates user-specific Quiz Scores 410 (see FIG. 3) to User Profile Server 340 to update User-Profile Information 342. Furthermore, Testing Server 350 preferably communicates user-specific Quiz Scores 410 to Content Regulation Server 320 to signal Content Regulation Server 320 to "unlock" for viewing the next Training Module 105, according to Unlocking Step 225, upon successful completion of each Quiz Section 580 (see FIG. 4 and FIG. 5) by User 200.

Media Server 365 (at least herein embodying wherein such virtual-immersion computer processor means comprises media-streamer computer processor means for streaming media over the at least one client-server architecture; and, at least herein embodying wherein such at least one virtual-immersion computer processor comprises at least one media-streamer computer processor structured and arranged to stream media over the at least one client-server architecture) preferably stores and preferably streams Media Content 367 to User Interface Server 360 to preferably be displayed to User 200 at User Interface 370, as shown. Media Content 367 preferably comprises video segments and audio files preferably used to generate structure fire simulations, other hazard zone simulations, radio-transmission simulations, and radio report s simulations useful in training User 200 in at least one fire command function. This arrangement at least herein embodies wherein such virtual-immersion computer interface means comprises virtual-immersion computer processor means for generating such at least one fire-incident management situation in such virtual immersion computer interface means; and, this arrangement at least herein embodies wherein such at least one virtual-immersion computer interface comprises at least one virtual-immersion computer processor structured and arranged to generate such at least one fire-incident management situation in such at least one virtual-immersion computer interface; and, this arrangement at least herein embodies wherein such step of providing virtual immersion comprises the step of computer-generating such at least one fire-incident management situation in at least one virtual-immersion computer interface.

Media Content 367, streamed by Media Server 365, preferably further comprises "Chief's Input" videos. "Chief's Input" videos preferably comprise talking head videos in which a fire chief preferably verbally coaches User 200 through presented material or questions (see further details below). This arrangement at least herein embodies wherein such management-mentor computer interface means comprises management-mentor computer processor means for generating mentoring in such management-mentor computer interface means; and, this arrangement at least herein embodies wherein such at least one management-mentor computer interface comprises at least one management-mentor computer processor structured and arranged to generate mentoring in such at least one management-mentor computer interface; and, this arrangement at least herein embodies wherein such step of providing management mentoring comprises the step of computer-generating mentoring in at least one management-mentor computer interface; and, this arrangement at least herein embodies wherein such management-mentor computer processor means comprises mentor media streamer computer processor means for streaming at least one mentoring media; and, this arrangement at least herein embodies wherein such at least one management-mentor computer processor comprises at least one mentor-media streamer computer processor structured and arranged to stream at least one mentoring media over the at least one client-server architecture.

In addition, Media Server 365 preferably comprises additional media resources, such as additional video and audio simulations, preferably available for download by Trainer Users 250 at Trainer Support Interface 385 upon completion of Incident Commander Train-the-Trainer Program 600 (see below).

File Server 335 preferably stores Instructional Files 337 preferably available for download by Trainer Users 250 at Trainer Support Interface 385 upon completion of Incident Commander Train-the-Trainer Program 600. Instructional Files 337 preferably comprise additional teaching resources, such as those comprised in Instructor's Package 630 or Additional Training Tools 645 (see FIG. 6) which Trainer Users 250 preferably may use for training of Students 650.

Administration Server 325 preferably comprises at least one Administration Interface 380, as shown. Administration Interface 380 preferably provides an interface accessible by administrative personnel affiliated with Program Provider 270. Administration Interface 380 preferably permits administrative personnel affiliated with Program Provider 270 to preferably update or change content provided by Server Environment 102. In addition, Administration Interface 380 preferably allows administrative personnel from Program Provider 270 to maintain proper functioning of Server Environment 102. Furthermore, Administration Interface 380 preferably allows administrative personnel from Program Provider 270 to access user-specific progress status information related to at least one User 200, including which Training Modules 105 have been successfully completed and Quiz Scores 410. Administration Interface 280 preferably permits administrative personnel from Program Provider 270 to preferably access Online Certification 232, preferably confirming the completion of Online Incident Commander Training Course 101 by User 200. Administrative personnel preferably accesses Administration Interface 380 preferably using at least one Internet-Enabled Computerized Device 395, as shown. Internet-Enabled Computerized Device 395 preferably comprises at least one personal computer (PC), alternately preferably at least one Internet enabled phone, alternately preferably at least one mobile internet-enabled device, alternately preferably at least one hand-held internet-enable device.

FIG. 3 shows a business flow chart view, illustrating the interchange of compensation, education, certification, and information between entities involved in Incident Commander Training and Certification Program 100, according to the preferred embodiment of FIG. 2. Incident Commander Training and Certification Program 100 preferably comprises interchange between User 200, Server Environment 102, at least one Program Provider 270, and at least one Regulatory Entity 275, as shown. Program Provider 270 preferably further comprises all personnel serving administrative functions related to services provided by Incident Commander Training and Certification Program 100. Regulatory Entity 275 preferably comprises a government organization preferably responsible for accrediting programs providing Incident Commander training and certifications.

While participating in Online Incident Commander Training Course 101, User 200 preferably receives Educational Information 230 from Server Environment 102 as part of Online Incident Commander Training Course 101, preferably at User Interface 370, as shown. User Interface 370 preferably permits User 200 to submit Responses 235 to Server Environment 102 as part of Online Incident Commander Training Course 101, as shown. Responses 235 preferably comprise answers to multiple choice questions, "Select all that apply questions", and answers to quiz questions (see below). Upon successful completion of Online Incident Commander Training Course 101, User 200 preferably is provided with at least one Online Portion Certification 232, as shown, preferably confirming that User 200 has successfully completed Online Incident Commander Training Course 101.

Server Environment 102 preferably permits Program Provider 270 to access user-specific Quiz Scores 410, as shown. Administrative personnel from Program Provider 270 preferably access Quiz Scores 410 at Administration Interface 380, as shown. In addition, Server Environment 102 preferably permits Program Provider 270 to access Online Portion Certification 232 in order to confirm successful completion of Online Incident Commander Training Course 101 by User 200. Server Environment 102 preferably permits administrative personnel from Program Provider 270 to preferably access Online Portion Certification 232 at Administration Interface 380 (at least embodying herein completion-record retriever computer interface means for providing retrieval of such at least one record indicating completion of all of such at least one skill training segments by the at least one applicant by at least one certification simulation lab provider; and, at least embodying herein at least one completion-record retriever computer interface structured and arranged to provide retrieval of such at least one record indicating completion of all of such at least one skill-training segments by the at least one applicant by at least one certification simulation lab provider; and, at least embodying herein retrieving such at least one record indicating completion status of all of such at least one skill training segments by the at least one applicant, upon request by at least one certification simulation lab provider), as shown.

Upon completion of Online Incident Commander Training Course 101, as confirmed by Online Portion Certification 232, Program Provider 270 preferably permits User 200 to participate in Certification Simulation 195, as shown. Program Provider 270 preferably provides Incident Commander Certification 240 to User 200 after completion of Certification Simulation 195, as shown. In exchange for services provided Incident Commander Training and Certification Program 100, User 200 preferably provides User Compensation 210, preferably in the form of payments, to Program Provider 270, as shown.

Server Environment 102 preferably receives Data Files 415 from Program Provider 270, as shown. Data Files 415 preferably comprise new, updated, modified, or repaired content, graphical material, or questions, and are preferably used to supply content to Online Incident Commander Training Course 101. In addition, Server Environment 102 preferably receives Media Content 368 from Program Provider 270, as shown. Media Content 368 preferably represents new, updated, modified, or repaired video segments and/or audio files, preferably utilized to supply dynamic media content to Online Incident Commander Training Course 101. Server Environment 102 preferably permits administrative personnel from Program Provider 270 to provide Data Files 415 and Media Content 368 at Administration Interface 380, as shown.

Regulatory Entity 275 preferably provides Accreditation 425 to Program Provider 270, as shown. Accreditation 425 preferably provides Program Provider 270 with a right to offer training and certifications to persons seeking the role of incident Commander.

FIG. 4 shows a diagrammatic view, illustrating the navigation path followed by User 200 through Online Incident Commander Training Course 101 of Incident Commander Training and Certification Program 100, according to the preferred embodiment of FIG. 1. User 200 preferably gains access to Online Incident Commander Training Course 101 by preferably providing at least one username-password combination 222 according to User Login Step 505, as shown.

User 200 preferably chooses which Training Module 105 to enter from at least one Main Navigation Page 500, according to step Module Selection 510, as shown. Main Navigation Page 500 preferably presents at least ten selection buttons, at least nine of which preferably allow selection of Training Modules 105, as shown. Training modules 105 which may be selected by User 200 at Main Navigation Page 500 preferably comprise Introductory Module 110, Assumption of Command Module 120, Situation Evaluation Module 130, Communications Module 140, Deployment Management Module 150, Develop Incident Action Plan Module 160, Incident Organization Module 170, Review Incident Action Plan Module 180, and Terminate Command Module 190, as shown. The remaining selection button preferably comprises at least one Certification Selection 192 which preferably is "unlocked" after User 200 has successfully completed all Training Modules 105, preferably allowing User 200 to access Online Portion Certification 232, as shown (see FIG. 3). Upon reading this specification, those with ordinary skill in the art will now appreciate that, under appropriate circumstances, considering such issues as program design preference, user preferences, cost, changing training and certification requirements, etc., other selection button arrangements, such as, for example, fewer selection buttons, more selection buttons, etc., may suffice.

Preferably, before User 200 has successfully completed any Training Modules 105, Introductory Module 110 preferably will be the only module which is "unlocked" for viewing by User 200 and may be selected by User 200 at Main Navigation Page 500. Alternatively, if User 200 returns to Server Environment 102 after a break in studying, all completed Training Modules 105 and at least one subsequent Training Module 105 following the last completed module preferably will be "unlocked" and available selection by User 200 at Main Navigation Page 500.

Upon module selection according to step Module Selection 510, User 200 preferably is redirected to the first WebPage 700 of a series of WebPages 700 encompassing a selected Training Module 105. The series of WebPages 700 encompassing a selected Training Module 105 preferably immerses User 200 through a sequential series of fire simulation situations for preferably training User 200 in at least one fire command function (this arrangement at least embodying herein sequential situation-navigator computer interface means for providing sequential situation-navigation of a plurality of such at least one fire-incident management situations to develop such at least one fire-incident management skill; and, this arrangement at least embodying herein at least one sequential situation-navigator computer interface structured and arranged to provide at least one sequential situation-navigation of at least one situation sequence of a plurality of such at least one fire-incident management situations to develop such at least one fire-incident management skill; and, this arrangement at least embodying herein providing sequential situation-navigation of a plurality of such at least one fire-incident management situations to develop such at least one fire-incident management skill).

As illustrated in FIG. 4, each WebPage 700 preferably must be viewed its entirety and any questions 522 preferably must be answered with Responses 235 before User 200 may advance to a subsequent WebPage 700 provided in Training Module 105 according to Page Advancement Step 530 or Page Advancement Step 532, as shown. The above described arrangement preferably ensures that User 200 is exposed to a pre-determined sequence of simulation situations related to at least one fire command function in Training Module 105. This arrangement at least embodies herein at least one situation-navigator regulator computer processor structured arranged to regulate navigation by the at least one applicant of such at least one sequential situation-navigation of such plurality of such at least one fire-incident management situations.

Current Page 520 preferably represents the first WebPage 700 of a series of WebPages 700 comprising at least one Training Module 105, as shown. Current Page 520 preferably provides Educational formation 230 viewable by User 200, as shown. Current Page 520 preferably may comprise text, graphics, and/or media content such as video segments or audio segments, as shown (see below). Current Page 520 preferably may also comprise at least one question 522 (at least embodying herein question-presenter computer interface means for presenting at least one question to the at least one applicant related to such at least one fire-incident management skill; and at least embodying herein at least one question-presenter computer interface structured and arranged to present at least one question to the at least one applicant related to such at least one fire-incident management skill; and at least embodying herein providing at least one question to the at least one applicant related to such at least one fire-incident management skill), requiring User 200 to preferably apply content learned on Current Page 520. If Current Page 520 only contains text, graphics, and/or media content, the slide preferably is satisfactorily completed once the content has been sufficiently reviewed by User 200, and at least one Subsequent Page 525 preferably is "unlocked." for viewing according to Page Advancement Step 530, preferably advancing User 200 to Subsequent Page 525, as shown.

If Current Page 520 contains at least one question 522, Current Page 520 preferably permits submission of at least one Response 235, as shown (this arrangement at least herein embodying wherein such question-presenter computer interface means comprises response-submitter computer interface means for allowing submission of at least one response from the at least one applicant related to such at least one question; and, this arrangement at least herein embodying wherein such at one question-presenter computer interface comprises at least one response-submitter computer interface structured and arranged to allow submission of at least one response from the at least one applicant related to such at least one question; and, this arrangement at least herein embodying wherein such step of providing at least one question further comprises the step of allowing submission at least one response from the at least one applicant related to such at least one question). Questions 522 provided on Current Page 520 preferably comprise at least one multiple choice question or at least one "select all that apply question". Upon reading this specification, those with ordinary skill in the art will now appreciate that, under appropriate circumstances, considering such issues as program design preference, user preferences, cost, changing training and certification requirements, future technologies, etc., other question arrangements, as, for example, non-multiple choice questions, fill-in-the-blank questions, essay questions, etc., may suffice.

Upon submission of at least one Response 235, User 200 preferably subsequently directed to Evaluation Page 535 according to Evaluation Step 545, as shown. Evaluation Page 535 preferably provides Feedback 234 (at least heroin embodying wherein such question-presenter computer interface means comprises correction-feedback-generator computer processor means for generating at least one correction feedback on such at least one response submitted by the at least one applicant related to such at least one question; and, at least herein embodying wherein such at least one question-presenter computer interface comprises at least one correction-feedback-generator computer processor structured and arranged to generate at least one correction feedback on such at least one response submitted by the at least one applicant related to such at least one question; and, at least herein embodying wherein such step of providing at least one question further comprises the step of providing at least one correction feedback on such at least one response submitted by the at least one applicant related to such at least one question) to User 200 based on such at least one submitted Response 235.

Feedback 234 preferably informs User 200 of correct and incorrect Responses 235 with at least one text-color change (this arrangement at least herein embodies wherein such at least one indicator comprises at least one text-color change). Feedback 234 preferably comprises informing User 200 of correct Responses 235 by preferably changing the color of the text of correct Responses 235 to green (this arrangement at least herein embodying wherein such correction-feedback-generator computer processor means comprises indicator-generator computer processor means for generating at least one indicator of such at least one correction feedback of such at least one response; and, this arrangement at least herein embodying wherein such at least one correction-feedback-generator computer processor comprises at least one indicator-generator computer processor structured and arranged to generate at least one indicator of such at least one correction feedback of such at least one response; and this arrangement at least herein embodying wherein such at least one indicator comprises at least one correct-indicator structured and arranged to indicate at least one correct response in such at least response; and, this arrangement at least herein embodying wherein such at least one correct-indicator comprises at least one text-color change of green). Feedback 234 preferably further comprises providing supporting information on correct Responses 235. In addition, Feedback 234 preferably comprises informing User 200 of incorrect Responses 235 by preferably changing the color of the text of incorrect Responses 235 to red (this arrangement at least herein embodying wherein such at least one indicator comprises at least one incorrect-indicator structured and arranged to indicate at least one incorrect response in such at least response; and, this arrangement at least herein embodying wherein such at least one incorrect-indicator comprises at least one text-color change of red). Evaluation Page 535 preferably comprises an embedded frame within Current Page 520 (see below). Upon reading this specification, those with ordinary skill in the art will now appreciate that, under appropriate circumstances, considering such issues as program design preference, user preferences, cost, changing training and certification requirements, future technologies, etc., other feedback arrangements, such as, for example, providing feedback at a separate WebPage, providing feedback with talking head videos, providing feedback with audio evaluations, etc., may suffice.

Preferably, once User 200 has reviewed Feedback 234 at Evaluation Page 535, Subsequent Page 525 preferably is "unlocked" for viewing by User 200 according to Page Advancement Step 532 (at least herein embodying wherein such at least one situation-navigation regulator computer processor comprises at least one access-grantor computer processor structured and arranged to grant access, within such at least one situation sequence, to at least one subsequent such at least one fire-incident management situation following completion of at least one prior such at least one fire incident management situation), as shown. Subsequent Page 525 preferably provides Educational Information 230 to User 200, as shown. If Subsequent Page 525 contains only text, graphics, and/or media content, Subsequent Page 525 preferably is satisfactorily completed once the content of Subsequent Page 525 has been sufficiently reviewed by User 200, preferably allowing at least one Subsequent Page 525 to be "unlocked" for viewing according to Page Advancement Step 533, as shown. However, if Subsequent Page 525 contains at least one question 522, Subsequent Page 525 preferably permits User 200 to submit at least one Response 235, as shown. Such at least one Response 235 preferably is reviewed at Evaluation Page 535 according to Evaluation Step 545, as shown. Preferably, after reviewing Feedback 234 at Evaluation Page 535, at least one Subsequent Page 525 preferably is "unlocked" permitting User 200 to advance to another Subsequent Page 525 according to Page Advancement Step 532, as shown. This cycle preferably is repeated until User 200 has completed each WebPage 700 (excluding Quiz Section 580) of Training Module 105 (this arrangement at least herein embodying providing sequential situation navigation of a plurality of such at least one fire incident management situations to develop such at least one fire incident management skill).

Once every WebPage 700 of Training Module 105 is completed, at least one Quiz Section 580 preferably is "unlocked", according to Quiz Unlocking Step 555, as shown. Quiz Unlocking Step 555 preferably advances User 200 to at least one Quiz Page 550, as shown. Quiz Section 580 preferably comprises multiple Quiz Pages 550. Questions 522 displayed on Quiz Page 550 (at least embodying herein quiz-presenter computer interface means for presenting at least one quiz to the at least one applicant at the end of such at least one skill-training segment; and at least embodying herein at least one quiz-presenter computer interface structured and arranged to present at least one quiz to the at least one applicant at the end of such at least one skill-training segment; and at least embodying herein providing at least one quiz to the at least one applicant at the end of such at least one skill-training segment) preferably test User 200 on the material covered in Training Module 105. Quiz Page 550 preferably permits User 200 to submit of Responses 235 to questions 522, as shown (this arrangement at least herein embodying wherein such quiz-presenter computer interface means comprises quiz-response-submitter computer interface means for allowing submission of at least one quiz response provided on such at least one quiz; and, this arrangement at least herein embodying wherein wherein such at least one quiz-presenter computer interface comprises at least one quiz-response-submitter computer interface structured and arranged to allow submission of at least one quiz response provided on such at least one quiz; and, this arrangement at least herein embodying wherein such step of providing at least quiz further comprises the step of receiving submission of at least one quiz response provided on such at least one quiz). Submitted Responses 235 preferably are evaluated at Quiz Evaluation Page 560 according to Quiz evaluation Step 565, as shown.

Quiz Evaluation Page 560 (at least herein embodying wherein such quiz-computer interface means comprises quiz-feedback computer processor means for providing at least one quiz-correction feedback on such at least one quiz response submitted by the at least one applicant; and at least herein embodying wherein such at least one quiz-presenter computer interface comprises at, least one quiz-feedback-generator computer processor structured and arranged to generate at least one quiz-correction feedback on such at least one quiz response submitted by the at least one applicant) preferably provides Feedback 234 to User 200, as shown. Feedback 234 preferably informs User 200 of correct and incorrect Responses 235 with at least one text-color change (this arrangement at least herein embodying wherein such at least one quiz-feedback-generator computer processor comprises at least one quiz-feedback indicator-generator computer processor structured and arranged to generate at least one quiz-feedback indicator of such at least one correction feedback of such at least one quiz response; and, this arrangement at least herein embodying wherein such at least indicator comprise at least one text color change). Feedback 234 preferably informs User 200 of correct Responses 235 by preferably changing the color of the text of correct Responses 235 to green (this arrangement at least herein embodying wherein such at least one quiz-feedback indicator comprises at least one correct-indicator structured and arranged to indicate at least one correct response such at least: response; and, this arrangement at least herein embodying wherein such at least one correct-indicator comprises at least one text color change of green). Feedback 234 preferably informs User 200 of incorrect Responses 235 by preferably changing the color of the text of incorrect Responses 235 to red (this arrangement at least herein embodying wherein such at least one quiz-feedback indicator comprises; and, this arrangement at least herein embodying wherein such at least one incorrect-indicator comprises at least one text color change of red). In addition, feedback 234 preferably comprises providing supporting information on correct responses. Quiz Evaluation Page 560 preferably comprises an embedded frame within Quiz Page 550. Upon reading this specification, those with ordinary skill in the art will now appreciate that, under appropriate circumstances, considering such issues as program design preference, user preferences, cost, changing training and certification requirements, future technologies, etc., other quiz evaluation arrangements, such as, for example, providing evaluations on a separate WebPage, talking head video evaluations, audio evaluations, etc., may suffice.

Preferably, Responses 235 submitted by User 200 during Quiz Section 580 preferably are scored and graded, generating user-specific Quiz Scores 410 (see FIG. 3). Preferably, Quiz Section 580 preferably is the only scored, graded, and recorded section of Training Module 105. User 200 preferably must obtain at least Minimum Score 585 (at least herein embodying wherein completion of such at least one skill-training segment requires at least one minimum of such at least one correct percentage) on Quiz Section 580 in order be permitted to advance to at least one subsequent Training Module 105 according to Unlocking Step 225, as shown. Minimum Score 585 preferably corresponds to a submission of seventy-five percent correct Responses 235 on Quiz Section 580. Upon reading this specification, those with ordinary skill in the art will now appreciate that, under appropriate circumstances, considering such issues as program design preference, user preferences, cost, changing training and certification requirements, etc., other minimum score arrangements, such as, for example, higher minimum scores, lower minimum scores, etc., may suffice.

Upon completion of Quiz Section 580 with at least Minimum Score 585, at least one subsequent Training Module 105 preferably is "unlocked" according to Unlocking Step 225 preferably permitting User 200 to select at least one subsequent Training Module 105 at Main Navigation Page 500, as shown. According to the steps shown in FIG. 4, User 200 preferably may complete each Training Module 105 offered by Online Incident Commander Training Course 101. User 200 preferably has up to three chances to pass Online Incident Commander Training Course 101 with an average of at least Minimum Score 585 on all Quiz Sections 580. Upon reading this specification, those with ordinary skill in the art will now appreciate that, under appropriate circumstances, considering such issues as program design preference, user preferences, changing training and certification requirements, etc., other passing score requirements, such as, for example, less than seventy-five percent, more than seventy-five percent, etc., may suffice.

Upon successful completion of Online Incident Commander Training Course 101, User 200 preferably is provided with Online Certification 232, as shown. Online Certification 232 preferably verifies that User 200 has successfully completed the online portion of Incident Commander Training and Certification Program 100. Online Certification 232 preferably permits User 200 to participate in Certification Simulation 195, as shown. Upon successful completion of Online Incident Commander Training Course 101 and Certification Simulation 195, User 200 preferably obtains at least one incident Commander Certification 240, as shown (also see FIG. 1 and FIG. 3).

FIG. 5 shows a diagrammatic view, illustrating the navigation path followed by Trainer User 250 through Online Incident Commander Training Course 101 as part of incident Commander Train-the-Trainer Program 600, according to another preferred embodiment of the present invention. Trainer Users 250 preferably follow the same navigation path followed by Users 200 through Online Commander Training Course 101 (see FIG. 4). As shown in FIG. 5, Trainer User 250 preferably is permitted access to Online Incident Commander Training Course 101 following User Login Step 505, as shown. Following User Login Step 505, Trainer User 250 preferably is directed to Main Navigation Page 500 (at least embodying herein at least one sequential skill-training-navigator computer face structured and arranged to provide at least one sequential skill-navigation of at least one skill-training sequence of a plurality of at least one skill-training segments to develop a plurality of such at least one fire-incident management skills), as shown, allowing Trainer User 250 to preferably select at one Training Module 105 according to step Module Selection 510, as shown. Trainer User 250 preferably must view the content of each WebPage 700 of each Training Module 105 and submit Responses 525 to any questions 522 before being permitted to advance to at least one Subsequent Page 525 according to Page Advancement Step 530 or Page Advancement Step 532, as shown and described in detail above.

Upon completion of each Training Module 105, Trainer User 250 preferably is advanced to at least one Quiz Page 550, preferably comprising Quiz Section 580, according to Quiz Unlocking Step 555, as shown. Quiz Page 550 preferably provides questions 522 to Trainer User 250 and preferably allows Trainer User 250 submit Responses 235 to questions 522, as shown. Trainer User 250 preferably is subsequently provided with Feedback 234 at Quiz Evaluation Page 560, as shown. If Trainer User 250 obtains a at least Minimum Score 585, Trainer User 250 preferably is advanced to at least one subsequent Training Module 105 according Unlocking Step 225, as shown. Upon successful completion of Online Incident Commander Training Course 101, Trainer User 250 preferably is provided with Online Certification 232, as shown.

Online Certification 232 preferably permits Trainer Users 250 to participate in Trainer Certification Simulation 605, as shown. Trainer Certification Simulation 605 preferably comprises six consecutive eight-hour days of training in which Trainer Users 250 preferably cover teaching and evaluation criteria necessary to train and certify other students to serve the role of Incident Commander. Trainer Certification Simulation 605 preferably also comprises the three-day curriculum covered in Certification Simulation 195 (see FIG. 4). Upon completion of Trainer Certification Simulation 605, Trainer Users 250 preferably receive Trainer Certification 640 preferably authorizing Trainer Users 250 to train and certify other students to serve the role of Incident Commander according to the curriculum provided by Incident Commander Training and Certification Program 100.

Figure 6:
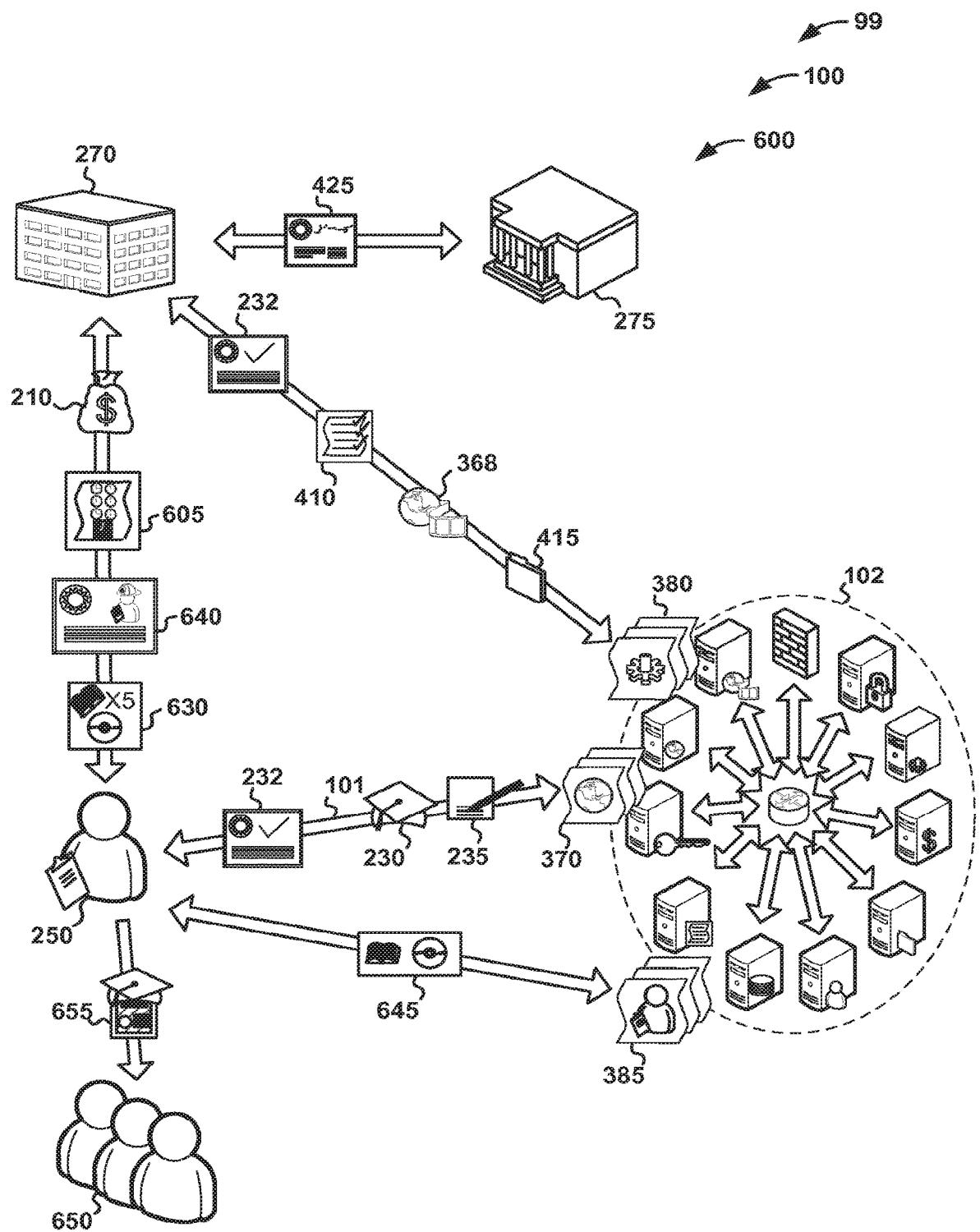
FIG. 6 shows a business flow chart view, illustrating the interchange of compensation, education, certification, and information between entities involved in the Incident Commander Train-the-Trainer Program, according to the preferred embodiment of FIG. 5.

FIG. 6 shows a business flow chart view, illustrating the interchange of compensation, education, certification, and information between entities involved in Incident Commander Train-the-Trainer Program 600, according to the preferred embodiment of FIG. 5. Incident Commander Train-the-Trainer Program 600 of Incident Commander Training and Certification Program 100 preferably comprises interchange between Trainer User 250, Server Environment 102, at least one Program Provider 270, and at least one Regulatory Entity 275, and Students 650, as shown. Server Environment 102 preferably allows Trainer User 250 to access Online Incident Commander Training Course 101 through User Interface 370, as shown. Server Environment 102 preferably provides Educational Information 230 to Trainer User 250 while Trainer User 250 preferably participates in Online Incident Commander Training Course 101, as shown. While participating in Online Incident Commander Training Course 101, Server Environment 102 preferably permits Trainer User 250 to submit Responses 235, as shown. Upon successful completion of Online Incident Commander Training Course 101, Server Environment 102 preferably provides Online Certification 232 to Trainer User 250, as shown.

Server Environment 102 preferably permits Program Provider 270 to access user-specific Quiz Scores 410 at Administration Interface 380, as shown. Server Environment 102 preferably permits Program Provider 270 to access Online Certification 232 at Administration Interface 380, as shown. Upon reading this specification, those with ordinary skill in the art will now appreciate that, under appropriate circumstances, considering such issues as program design preference, user preferences, cost, company preferences, future technologies, etc., other information accessing arrangements, such as, for example, email, file-transfer protocol (FTP), etc., may suffice.

Upon completion of Online Incident Commander Training Course 101, Program Provider 270 preferably provides Trainer User 250 with Trainer Certification Simulation 605, as shown. Upon successful completion of both Online Incident Commander Training Course 101 and Trainer Certification Simulation 605, Trainer Users 250 preferably are provided with Trainer Certification 640 from Program Provider 270, as shown. In addition, Program Provider 270 preferably provides Trainer Users 250 with Instructor's Package 630, as shown.

Instructor's Package 630 preferably provides a series of instruction tools to be preferably used by certified Trainer Users 650 to train individuals in their respective home departments. Instructor's Package 630 preferably comprises at least ten complete core simulations each comprising a PowerPoint review and instructor's guide. In addition Instructor's Package 630 preferably comprises at least one Command Function Overview PowerPoint and Instructor's Guide book, and at least one Communication Overview PowerPoint and Instructor's Guide book. Furthermore, Instructor's Package 630 preferably comprises at least five Tactical Template Instructor's Guide books preferably corresponding to the five basic occupancy/building types. The five basic occupancy/building types preferably comprise residential structures, multi-unit residential structures, strip malls, commercial structures, and big-box structures. Each Tactical Template Instructor's Guide book preferably comprises a three-ring binder containing teaching resources for training students how to command and manage hazard zone situations at the five basic occupancy/building types. Furthermore, Instructor's Package 630 preferably comprises the Fire Command video series, preferably comprising videos in DVD format, eight of which preferably correspond to the eight command functions of an Incident Commander and one of which corresponds to and introductory DVD. Instructor's Package 630 further comprises at least three Critical Fire Ground Factor video series, preferably in DVD format, preferably relating to fire behavior in commercial buildings. Instructor's Package 630 further comprises an overview of new residential roof systems, and an instruction on how to measure and manage risks. Instructor's Package 630 further comprises at least one Managing Mayday video series, preferably comprising at least four videos preferably in DVD format. Upon reading this specification, those with ordinary skill in the art will now appreciate that, under appropriate circumstances, considering such issues as program design preference, company preferences, accreditation requirements, etc., other instruction tools, such as, for example, additional books, additional DVDs, CDs, software programs, other hazard zone simulation tools, etc., may suffice.

In exchange for the provided training and certification services, Program Provider 270 preferably accepts User Compensation 210 from Trainer Users 250, as shown in FIG. 5.

Upon receipt of Trainer Certification 640, certified Trainer User 250 preferably are permitted access to Trainer Support Interface 385 provided by Server Environment 102, as shown. Trainer Support Interface 385 preferably comprises a user interface preferably allowing Trainer User 250 to access Additional Training Tools 645, as shown. Additional Training Tools 645 preferably comprises additional media and teaching resources such as additional simulations and additional instructor's packages for both command, tactical, and task level training. Such Additional Training Tools 645 preferably are available for download by Trainer Users 250 at Trainer Support Interface 385. Upon reading this specification, those with ordinary skill in the art will now appreciate that, under appropriate circumstances, considering such issues as program design preference, company preferences, user preference, future technologies, etc., other methods to access additional training tools, such as, for example, email, mail, facsimile, etc., may suffice.

In addition, Trainer User 250 holding Trainer Certification 640 preferably is entitled to provide Incident Commander Training 655 to Students 650, preferably in order to train and certify Students 650 to fill the role of Incident Commander at emergency response scenes containing hazard zones, as shown.

Server Environment 102 preferably receives Data Files 415 from Program Provider 270, as shown. Data Files 415 preferably comprise new, updated, modified, or repaired content, including graphical data or questions preferably to be used to supply content to Online Incident Commander Training Course 101. In addition, Data Files 415 preferably comprises content, including graphical data or questions, available for download by certified Trainer Users 250 at Trainer Support interface 385. Server Environment 102 preferably permits Program Provider 270 to provide Data Files 415 at Administration interface 380, as shown. In addition, Server Environment 102 preferably receives Media Content 368 from Program Provider 270, as shown. Media Content 368 preferably comprises new, updated, modified, or repaired video segments and/or audio files, preferably utilized to supply dynamic content to Online incident Commander Training Course 101. In addition, Media Content 368 preferably comprises video segments and/or audio files available for download by certified Trainer Users 250 at Trainer Support Interface 385.

Regulatory Entity 275 preferably provides Accreditation 425 to Program Provider 270, as shown. Accreditation 425 preferably provides Program Provider 270 with a right to offer trainer certifications to persons seeking to train other persons seeking to serve the role of Incident Commander.

Figure 7:
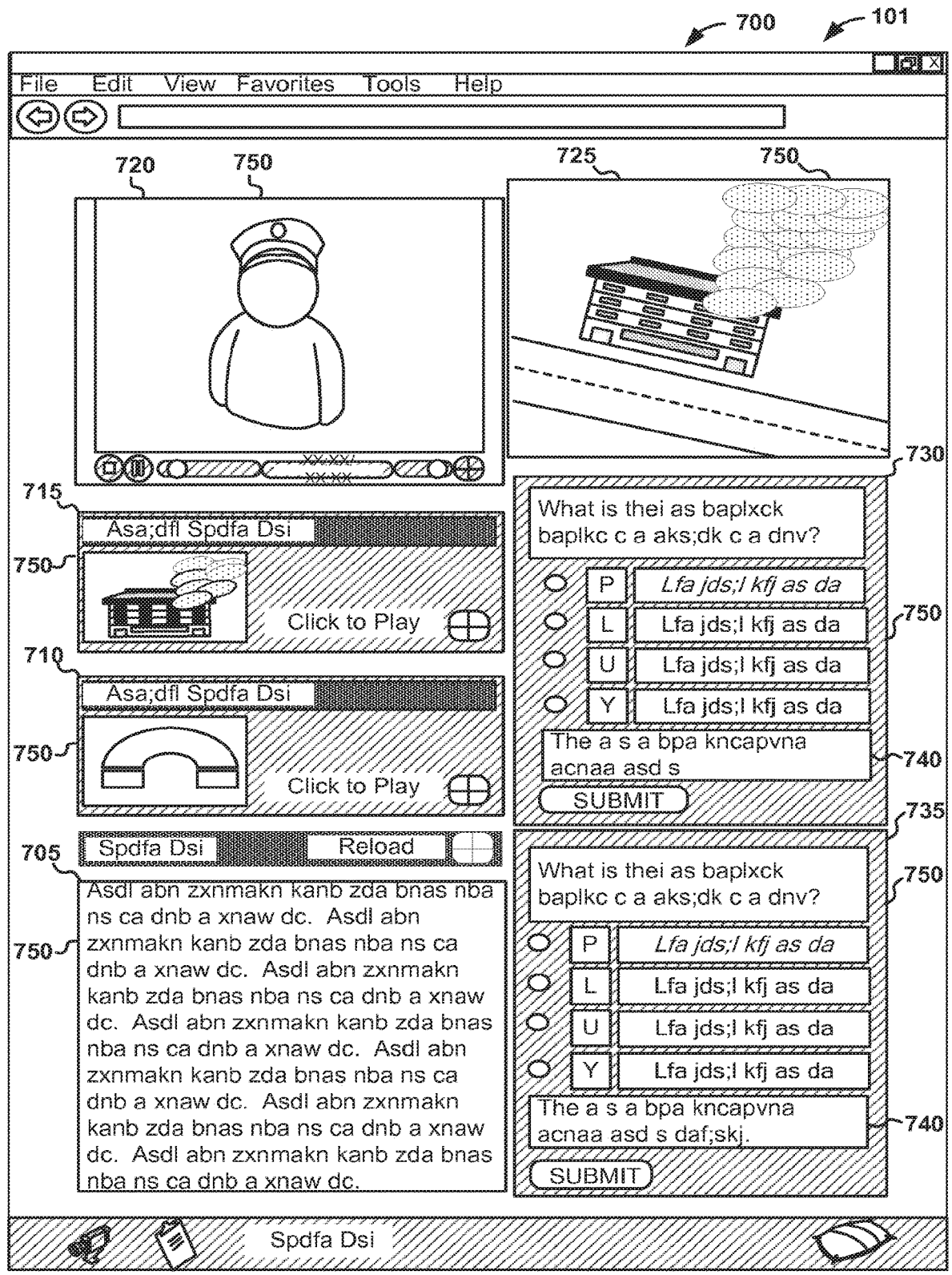
FIG. 7 shows a screenshot view, illustrating the types of web frames viewable on WebPages of the Online Incident Commander Training Course, according to the preferred embodiment of FIG. 1.

FIG. 7 shows a screenshot view, illustrating the types of web frames 750 viewable on WebPages 700 of Online Incident Commander Training Course 101, according to the preferred embodiment of FIG. 1. WebPages 700 of Training Modules 105 preferably may comprise at least one or more of the several web frame 750 'types' illustrated in FIG. 7. Types of web frames 750 viewable on a WebPage 700 of Training Modules 105 preferably comprise Content Frames 705, Audio Frames 710, Video with Audio Frames 715, "Chief's Input" Frames 720, Picture Frames 725, Multiple Choice Frames 730, and "Select all that Apply" Frames 735, as shown.

Content Frames 705 (at least embodying herein text-computer display means for displaying at least one textual content related to training the at least one applicant in at least one fire incident management skill; and, at least embodying herein at least one text-computer display structured and arranged to display at least one textual content related to training the at least one applicant in such at least one fire-incident management skill) preferably contain text and/or images providing information users 200 and Trainer Users 250 must know in order to successfully complete Incident Commander Training and Certification Program 100. This arrangement at least embodies herein text computer display means for displaying at least one textual content related to training the at least one applicant in at least one fire incident management skill.

Audio Frames 710 preferably comprise at least one audio file preferably employed as a teaching tool (this arrangement at least herein embodying wherein such media-streamer computer processor means streams at least one audio stream; and, this arrangement at least herein embodying wherein such at least one media-streamer computer processor streams at least one audio stream). Audio Frames 710 preferably comprise at least one sample radio transmission or at least one sample radio report (this arrangement at least herein embodying wherein such media-streamer computer processer means streams at least one radio-transmission-simulation audio stream; and, this arrangement at least herein embodying wherein such at least one media-streamer computer processor streams at least one radio-transmission-simulation audio stream). Upon reading this specification, those with ordinary skill in the art will now appreciate that, under appropriate circumstances, considering such issues as program design preference, user preference, changing training and certification requirements, future technologies, etc., other audio files, such as, for example, audio files of fire simulations, audio files of hazard zone simulations, etc., may suffice.

Video with Audio Frames 715 preferably comprise a combination video and audio file which Users 200 and Trainer Users 250 may watch and Listen as part of their online training. Video with Audio Frames 715 preferably comprise video clips displaying structure fire simulations or other simulated hazard zone situations (this arrangement at least herein embodying wherein such media-streamer computer processor means streams at least one simulation-video stream; and, this arrangement at least herein embodying wherein such at least one media-streamer computer processor streams at least one simulation-video stream). Audio Frames 710 and Video with Audio Frames 715 preferably create a simulation-based style of instructions by integrating real world hazard zone situations into the online training program. Audio Frames 710 and Video with Audio Frames 715 preferably are played, paused, and stopped at the discretion of User 200 or Trainer User 250.

"Chief's Input" Frames 720 (at least embodying herein management-mentor computer interface means for providing management mentoring to the at least one applicant while in such at least one fire-incident management situation to develop at least one fire-incident management skill; and, at least embodying herein at least one management-mentor computer interface structured and arranged to provide management mentoring to the at least one applicant while in such at least one fire-incident management situation to develop at least one fire-incident management skill; and, at least embodying herein providing management mentoring to the at least one applicant while in such at least one fire-incident management situation to develop at least one fire-incident management skill) preferably comprise video with audio files presenting a short talking head video clip in which a Fire Chief will provide input on a particular question, scenario, or topic related to at least one command function. "Chief's Input" Frames 720 preferably are designed to coach Users 200 or Trainer Users 250 through particular material or a particular question in a given Training Module 105 (this arrangement at least herein embodying wherein such management-mentoring computer interface means comprises question-mentoring computer interface means for providing question mentoring to the at least one applicant relating to such at least one question; and, this arrangement at least herein embodying wherein such at least one management-mentoring computer interface further comprises at least one question-mentoring computer interface structured and arranged to provide question mentoring to the at least one applicant relating to such at least one question; and this arrangement at least herein embodying wherein such step of providing management mentoring further comprises the step of providing question mentoring to the at least one applicant relating to such at least one question). "Chief's Input" Frames 720 preferably are played, paused, or stopped at the discretion of User 200 or Trainer User 250.

Picture Frames 725 (at least embodying herein image-computer interface means for displaying at least one image representing at least one fire incident situation; and, at least embodying herein at least one image computer interface structured and arranged to display at least one image representing such at least one fire-incident situation) preferably comprise a still image, preferably illustrating a hazardous scene such as a structure fire, as shown. Multiple Choice Frames 730 (at least herein embodying wherein such question-presenter computer interface means comprises multiple-choice question computer interface means for providing at least one multiple-choice question to the at least one applicant related to such at least one fire-incident management skill; and, at least herein embodying wherein such at least one question-presenter computer interface comprises at least one multiple-choice question-presenter computer interface structured and arranged to present at least one multiple-choice question to the at least one applicant related to such at least one fire-incident management skill) preferably comprise at least one question and group of answers from which Users 200 or Trainer Users 250 preferably select from and preferably submit as part of Response 235 (see FIG. 1, FIG. 3., FIG. 4, FIG. 5, and FIG. 6), as shown. "Select All that Apply" Frames 735 (at least herein embodying wherein such question-presenter computer interface means comprises select-all-that-apply question computer interface means for providing at least one select-all-that-apply question to the at least one applicant related to such at least one fire-incident management skill; and at least herein embodying wherein such at least one question-presenter computer interface comprises at least one select-all-that-apply question-presenter computer interface structured and arranged to present at least one select-all-that-apply question to the at least one applicant related to such at least one fire-incident management skill) preferably comprise at least one question and a group of answers from which Users 200 or Trainer Users 250 preferably select all that apply and submit as part of Response 235 (see FIG. 1, FIG. 3, FIG. 4, FIG. 5, and FIG. 6), as shown.

Following submission of answers to multiple choice questions or "select all that apply" questions, at least one Information Box 740 preferably appears, as shown, preferably providing supporting information for the correct answer(s). In addition, after answer submission, correct answers preferably are highlighted in green and incorrect answers preferably are highlighted in red. This arrangement preferably comprises Evaluation Page 560, as shown in FIG. 4 and FIG. 5.

Online Incident Commander Training Course 101 preferably comprises at least nine categories of WebPages 700 comprising various combinations of web frames 750 illustrated in FIG. 7. "Content pages" of Online Incident Commander Training Course 101 preferably are WebPages 700 comprising Content Frames 705, preferably having text and/or images to describe key points. "Video pages" of Online Incident Commander Training Course 101 preferably are WebPages 700 preferably comprising Video with Audio Frames 710 which preferably provide fire simulations or other hazard zone simulations (this arrangement at least herein embodying wherein such media-streamer computer processor means streams at least one video stream; and, arrangement at least herein embodying wherein such at least one media-streamer computer processor streams at least one video stream). "Multiple choice pages" preferably comprise at least one Multiple Choice Frame 730 and at least one Video with Audio Frame 715 preferably presenting a structure fire simulation or other hazard zone simulation which is preferably related to the presented multiple choice question.

"Multiple choice with chief interaction" pages preferably comprise at least one Multiple Choice Frame 730, at least one Video with Audio Frame 715 preferably presenting a structure fire simulation or other hazard zone simulation, and at least one "Chief's Input" Frame 720. "Chief's input" Frame 720 preferably is played as needed by User 200 or Trainer User 250 to assist with answering the multiple choice question.

"Multiple Choice with Radio Traffic" pages preferably comprise at least one Multiple Choice Frame 730, at least one Picture Frame 725 preferably providing at least one image, preferably at least one still picture of a structure-fire simulation, and at least one Audio Frame 710 preferably providing a sample radio transmission or radio report. The sample' radio transmission or radio report preferably will assist User 200 or Trainer User 250 to answer the multiple choice question.

"Multiple Choice with Chief Interaction and Radio Report" pages preferably comprise at least one Multiple Choice Frame 730, at least one Video with Audio Frame 715 preferably providing a structure fire simulation video or other hazard zone simulation video, at least one Picture Frame 725 preferably providing a still frame of the presented simulation video, at least one Audio Frame 710 preferably providing a sample radio transmission or radio report, and at least one "Chief's Input" Frame 720. "Chief's Input" Frame 720 preferably is played as needed by User 200 or Trainer User 250 to assist with answering the multiple choice question.

"Select All that Apply with Chief Interaction" pages preferably comprise at least one "Select All that Apply" Frame 735, at least one Video with Audio Frame 715 presenting a structure fire simulation or other hazard zone simulation, and at least one "Chief's Input" Frame 720. These pages may also comprise at least one Audio Frame 710 preferably providing at least one sample radio transmission or at least one radio report. "Chief's Input" Frame 720 preferably is played as needed by User 200 or Trainer User 250 to assist with answering the multiple choice question.

"Select All that Apply with Radio Traffic" pages preferably comprise at least one "Select All that Apply" Frame 735, at least one Audio Frame 710 preferably providing at least one sample radio transmission or at least one radio report. "Select All that Apply with Radio Traffic" pages preferably may also comprise at least one "Chief's Input" Frames 720.

Quiz pages preferably combine Multiple Choice Frames 730, "Select All that Apply" Frames 735, Video with Audio Frames 715, Audio Frames 710, and Picture Frames 725.

Upon reading this specification, those with ordinary skill in the art will now appreciate that, under appropriate circumstances, considering such issues as program design preference, user preference, changing training and certification requirements, future technologies, etc., other WebPage arrangements, such as, for example, other combinations of web frames, introduction of other web frame types, etc., may suffice.

Although applicant has described applicant's preferred embodiments of this invention, it will be understood that the broadest scope of this invention includes modifications such as alternate technology information transmittal, other teaching methods, other user profiles, etc. Such scope is limited only by the below claims as read in connection with the above specification.

We claim:

1. A virtual-immersion webpage method comprising:
providing, by a processor of a media server, virtual-immersion, via a series of webpages, to an applicant in a fire-incident management situation,
wherein the virtual immersion trains the applicant in fire incident management skills corresponding to functions performed in a fire-incident management situation involving a burning structure,
wherein the processor comprises a media-streamer computer processor that streams media over a client-server architecture,
wherein the media comprises at least one of a simulation-video stream, an audio stream, or a radio-transmission-stream;
structuring, by the processor, the media within a web frame of a webpage,
wherein the media comprises at least one of an Audio Frame, a Picture Frame, or a Video with Audio Frame,
wherein the virtual immersion comprises a text-computer display displaying a textual content and an image computer interface displaying an image representative of the fire-incident management situation;
unlocking, by the processor using an unlocking module, access to the virtual immersion to the fire-incident management situation in response to completion of a previous fire-incident management situation and in response to a user profile including completed modules with acceptable scores;
revoking, by the processor, access to the virtual immersion to the fire-incident management situation in response to an expiration period signifying the completion of the previous fire-incident management situation;
providing, by the processor, management mentoring, via the series of webpages, to the applicant while in the fire-incident management situation to develop a fire-incident management skill in response to a management-mentor computer processor comprising a mentor-media streamer for streaming mentoring media, wherein the mentoring media comprises the web frame, wherein the web frame comprises a Chief's Input Frame over the client-server architecture;
unlocking, by the processor using the unlocking module, access to the management mentoring to the fire-incident management situation in response to the completion of the previous fire-incident management situation and in accordance with the user profile including the completed modules with the acceptable scores;

revoking, by the processor using the revoker computer, access to the management mentoring to the fire-incident management situation in response to the expiration period beginning at the completion of the previous fire-incident management situation;

providing, by the processor, regulation of sequential skill-training navigation, via the series of webpages, by the applicant of a skill-training sequence of skill-training segments, wherein the regulation enforces the skill-training sequence of the skill-training segments to develop the fire-incident management skills, wherein the enforcing comprises:

requiring, by the processor using a content-regulation server, each web frame of each fire-incident management skill-training segment to be viewed in its entirety before the applicant may advance in the skill-training sequence;

requiring, by the processor using the content-regulation server, any questions retrieved from a database server answered with responses before the applicant may advance in the skill-training sequence, wherein the content-regulation server regulates a display of the web frame according to User-Profile Information retrieved from a User-Profile server;

obtaining, by the content-regulation server, from a testing server comprising a correct percentage of the responses;

updating, by the processor using the content-regulation server, the user-profile information to create a record indicating the completion of the fire incident management skill-training sequence for any the applicant having a score satisfying a predetermined minimum following a predetermined maximum number of attempts and unlocking, by an access-grantor computer processor, web frame in response to the updating;

requiring, by the processor using the content-regulation server, any the applicant having the score failing to satisfy the predetermined minimum following the predetermined maximum number of attempts to repeat the fire-incident management skill-training sequence;

unlocking, by the processor using the unlocking module and in accordance with the user profile including the completed modules with the acceptable scores, access to the fire-incident management skill-training segment in response to the completion of the previous fire-incident management skill-training segment;

revoking, by the processor using the revoker computer, access to the fire-incident management skill-training segment after the expiration period beginning at the completion of the previous fire-incident management skill-training segment;

wherein the providing the virtual immersion comprises computer-generating the fire-incident management situation in a virtual-immersion computer interface of the media server, wherein the fire-incident management situation includes a radio transmission simulation and an image representing a fire incident;

unlocking, by the processor using the unlocking module, access to the radio transmission simulation and the image representing the fire incident to the fire-incident management situation, in response to the completion of the previous fire-incident management situation and in accordance with the user profile including the completed modules with the acceptable scores;

revoking, by the processor using the revoker computer, access to the radio transmission simulation and the image representing the fire incident to the fire-incident management situation in response to the expiration period of a previous fire-incident management situation;

wherein the providing management mentoring comprises computer-generating mentoring in a management-mentor computer interface, wherein the mentoring comprises a video in which a speaker coaches the applicant;

unlocking, by processor using the unlocking module, access to the mentoring in the management-mentor computer, in response to the completion of a previous mentoring situation and in accordance with the user profile including the completed modules with the acceptable scores;

revoking, by the processor using the revoker computer, access to the mentoring in the management-mentor computer in response to the completion of the previous mentoring situation;

wherein the providing virtual immersion and the providing management mentoring provides training to the applicant in the fire incident management skill using a client-server architecture, wherein the plurality of servers comprise the content-regulation server, the user profile server, the database server, the testing server, and the media server;

unlocking, by the processor using the unlocking module, access to the train-the-trainer computer interface in response to completion of an online incident commander training course and in accordance with the user profile including the completed modules with the acceptable scores;

customizing, by the processor using a train-the-trainer computer interface, software, video, topography, resource levels and operating procedures of the Incident Commander Training and Certification Program according to the needs of local departments;

revoking, by the processor using the revoker computer, access to the train-the-trainer computer interface after the expiration period indicating the completion of the online incident commander training course;

specifying, by the processor using a user-specific progress status information module, successfully completed training modules;

resuming, by the processor, navigation in response to the successfully completed training modules;

controlling, by the processor using a regulation server, web page advancement; and providing, by the processor, access to a subsequent web page in response to completion of a prior webpage with the training module.

2. The method of claim 1, wherein the burning structure comprises at least one of a residential structure, multi-unit residential structure, strip mall, commercial structure or big-box structure.

3. The method of claim 1, further comprising providing, by the processor using a sequential situation-navigator computer interface, a sequential situation-navigation of a situation sequence of a plurality of such fire-incident management situations to develop the fire-incident management skill.

4. The method of claim 1, further comprising regulating, by the processor using a situation-navigator regulator computer processor, navigation by the applicant of the sequential situation navigation of the fire-incident management situations;

wherein the sequential situation-navigator regulator enforces the situation sequence of a plurality of fire-incident management situations to develop a plurality of the fire-incident management skills, wherein the enforcing comprises:

requiring each fire-incident management situation to be viewed in its entirety and any questions answered with responses before the applicant may advance in the situation sequence;

obtaining, from the least one score-calculator computer processor structured and arranged to calculate a score, the correct percentage of the responses;

creating a record indicating completion of the fire incident management situations for any the applicant having a score satisfying a predetermined minimum following a predetermined maximum number of attempts; and requiring any the applicant having the score failing to satisfy the predetermined minimum following the predetermined maximum number of attempts to repeat the situation sequence.

5. The method of claim 1, wherein the skill-training sequence provides training in at least three of the fire-incident management skills selected from the following:
 a) assumption of command;
 b) situation evaluation;
 c) communication;
 d) deployment management;
 e) incident action plan development;
 f) incident organization;
 g) incident action plan review;
 h) termination of command.

6. The method of claim 1, further comprising regulating, by the processor using a skill-navigation regulator computer processor, navigation by the applicant in the sequential skill-navigation of the three skill training segments.

7. The method of claim 1, further comprising presenting, by the processor using a quiz-presenter computer interface, a quiz to the applicant at an end of the skill training segment.

8. The method of claim 1, further comprising generating, by the processor using a quiz-presenter computer interface, a quiz-correction feedback on a quiz response submitted by the applicant.

9. The method of claim 1, further comprising:
 a) storing, by the processor using a completion-record storer computer processor, a record indicating completion by the applicant of all of the skill-training segments; and
 b) providing, by the processor using a completion-record retriever computer interface, retrieval of the record indicating completion of all of the skill-training segments by the applicant by a certification simulation lab provider.

10. The method of claim 1, wherein the processor comprises a media-streamer computer processor that streams media over the client-server architecture, wherein the media comprises at least one of: simulation-video stream or audio stream comprising a radio-transmission-simulation audio stream.

11. The method of claim 1, further comprising providing sequential situation-navigation of a plurality of such fire-incident management situations to develop the fire-incident management skill, wherein the regulating comprises:

requiring each fire-incident management situation to be viewed in its entirety and any questions answered with responses before the applicant may advance in the situation sequence;

obtaining, from the score-calculator computer processor that calculates a score based on the correct percentage of the responses;

creating a record indicating completion of the fire-incident management situations for any the applicant having a score satisfying a predetermined minimum following a predetermined maximum number of attempts;

requiring any the applicant having the score failing to satisfy the predetermined minimum following the predetermined maximum number of attempts to repeat situation sequence.

12. The method of claim 1, further comprising providing storing progress of the applicant within each of the skill-training segments to permit non-continuous training.

13. The method of claim 1, further comprising providing a question to the applicant related to the fire-incident management skill.

14. The method of claim 1, wherein the providing the question further comprises providing a correction feedback on a response submitted by the applicant related to the question.

15. The method of claim 1, wherein the providing management mentoring further comprises providing question mentoring to the applicant relating to the question.

16. The method of claim 1, further comprising providing:
 storing a record indicating completion by the applicant of all of the skill training segments; and
 retrieving the record indicating completion status of all of the skill training segments by the applicant, upon request by a certification simulation lab provider.

17. The method of claim 1, further comprising:
 requiring, by the processor using the content-regulation server having a sequential skill-training-navigator regulator that regulates navigation by the applicant of the skill-training sequence, each web frame of each of the plurality of skill-training segments to be viewed in its entirety and any questions retrieved from the database server answered with responses before the applicant may advance in the skill-training sequence, wherein the content-regulation server regulates the display of the web frame according to User-Profile Information retrieved from a User-Profile server; and
 requiring, by the content-regulation server, the applicant to repeat the skill-training sequence in response to failing to provide a predetermined minimum number of the responses that are correct.

18. The method of claim 1, wherein the fire incident management skills comprise eight fire incident management skills corresponding to functions performed at the fire-incident management situation, the eight fire incident management skills comprising:
 a) assumption of command,
  wherein the system is configured to train the applicant to assume and quickly establish command and how to manage ongoing command in fire-incident situations;
 b) situation evaluation,
  wherein the system is configured to train the applicant to properly evaluate incident conditions using at least one of vision, maps, pre-plans, reference materials, or time measuring;

c) communication,
   wherein the system is configured to train the applicant to follow standard operating procedures for effective radio communication, including delivery of timely progress reports of fire incident status;
d) deployment management,
   wherein the system is configured to train the applicant on at least one of: how to dispatch fire department resources, how to maintain accountability of on-scene resources, or how to manage work/rest cycle of all resources employed in the fire-incident site;
e) incident action plan development,
   wherein the system is configured to train the applicant on at least one of: how to develop an incident action plan strategy or how to manage and control operations within the strategy;
f) incident organization,
   wherein the system is configured to train the applicant on at least one of: how to develop incident organization, how to keep resources connected, how to delegate control of management, or how to build effective command teams;
g) incident action plan review,
   wherein the system is configured to train the applicant on at least one of: how to carry out fire command functions in standard order, how to receive, confirm, and evaluate conditions, or how to use incident action plan strategy as a checklist for revisions; and
h) termination of command,
   wherein the system is configured to train the applicant on at least one of: how to estimate the length of command required, how to consider time and resources needed for completion of each tactical priority, how to provide rehabilitation, rotation, and relief for command staff, how to reduce a command structure at ending stages of the incident, or how to provide post-incident review with hazard zone workers.

19. An Incident Commander hazard zone online training system comprising:
   a media server structured to provide electronic certification training comprising a plurality of training modules each comprising educational information related to skills for developing a hazard zone incident action plan to address a hazard zone incident involving a burning structure;
   wherein the electronic certification training in the hazard zone incident action plan comprises:
   unlocking, by an unlocking module and in accordance with a user profile including a completed modules with acceptable scores, access to the electronic certification training to the hazard zone incident action plan after completion of a previous hazard zone incident action plan;
   revoking, by a revoker computer, access to the electronic certification training to the hazard zone incident action plan in response to a completion of a previous hazard zone incident action plan;
   a testing server that requires a user to complete a quiz corresponding to each training module;
   a content regulation server structured to unlock a second training module of the plurality of training modules in response to the user viewing and completing a first training module of the plurality of training modules;
   a quiz-computer interface comprising a quiz-feedback processor that provides quiz-correction feedback on the quiz;
   an Administration Interface comprising a completion-record retriever computer interface whereby a Certified Hazard Zone Incident Commander Trainer may retrieve a record indicating completion of a skill training segment by the user and confirm the completion of the skill training segment by the user; and
   a Trainer Support Interface comprising a user interface whereby the Certified Hazard Zone Incident Commander Trainer accesses Additional Training Tools comprising at least one of media or simulations whereby the Certified Hazard Zone Incident Commander Trainer may provide at least one of command, tactical, or task level training to train the user to serve in a role of a hazard zone Incident Commander;
   wherein access to the Administration Interface and the Trainer Support Interface is granted in response to completing virtual immersion training to serve in the role of the Certified Hazard Zone Incident Commander Trainer.

20. A system comprising:
   a processor; and
   a tangible, non-transitory memory configured to communicate with the processor,
   the tangible, non-transitory memory having instructions stored thereon that, in response to execution by the processor, cause the processor to perform operations comprising:
   providing, by the processor of a media server, virtual-immersion, via a series of webpages, to an applicant in a fire-incident management situation,
   wherein the virtual immersion trains the applicant in fire incident management skills corresponding to functions performed in a fire-incident management situation involving a burning structure,
   wherein the processor comprises a media-streamer computer processor that streams media over a client-server architecture,
   wherein the media comprises at least one of a simulation-video stream, an audio stream, or a radio-transmission-stream;
   structuring, by the processor, the media within a web frame of a webpage,
   wherein the media comprises at least one of an Audio Frame, a Picture Frame, or a Video with Audio Frame,
   wherein the virtual immersion comprises a text-computer display displaying a textual content and an image computer interface displaying an image representative of the fire-incident management situation;
   unlocking, by the processor using an unlocking module, access to the virtual immersion to the fire-incident management situation in response to completion of a previous fire-incident management situation and in response to a user profile including completed modules with acceptable scores;
   revoking, by the processor, access to the virtual immersion to the fire-incident management situation in response to an expiration period signifying the completion of the previous fire-incident management situation;
   providing, by the processor, management mentoring, via the series of webpages, to the applicant while in the fire-incident management situation to develop a fire-incident management skill in response to a management-mentor computer processor comprising a mentor-media streamer for streaming mentoring media,
   wherein the mentoring media comprises the web frame,
   wherein the web frame comprises a Chief's Input Frame over the client-server architecture;

unlocking, by the processor using the unlocking module, access to the management mentoring to the fire-incident management situation in response to the completion of the previous fire-incident management situation and in accordance with the user profile including the completed modules with the acceptable scores;

revoking, by the processor using the revoker computer, access to the management mentoring to the fire-incident management situation in response to the expiration period beginning at the completion of the previous fire-incident management situation;

providing, by the processor, regulation of sequential skill-training navigation, via the series of webpages, by the applicant of a skill-training sequence of skill-training segments, wherein the regulation enforces the skill-training sequence of the skill-training segments to develop the fire-incident management skills, wherein the enforcing comprises:

requiring, by the processor using a content-regulation server, each web frame of each fire-incident management skill-training segment to be viewed in its entirety before the applicant may advance in the skill-training sequence;

requiring, by the processor using the content-regulation server, any questions retrieved from a database server answered with responses before the applicant may advance in the skill-training sequence, wherein the content-regulation server regulates a display of the web frame according to User-Profile Information retrieved from a User-Profile server;

obtaining, by the content-regulation server, from a testing server comprising a correct percentage of the responses;

updating, by the processor using the content-regulation server, the user-profile information to create a record indicating the completion of the fire incident management skill-training sequence for any the applicant having a score satisfying a predetermined minimum following a predetermined maximum number of attempts and unlocking, by an access-grantor computer processor, web frame in response to the updating;

requiring, by the processor using the content-regulation server, any the applicant having the score failing to satisfy the predetermined minimum following the predetermined maximum number of attempts to repeat the fire-incident management skill-training sequence;

unlocking, by the processor using the unlocking module and in accordance with the user profile including the completed modules with the acceptable scores, access to the fire-incident management skill-training segment in response to the completion of the previous fire-incident management skill-training segment;

revoking, by the processor using the revoker computer, access to the fire-incident management skill-training segment after the expiration period beginning at the completion of the previous fire-incident management skill-training segment;

wherein the providing the virtual immersion comprises computer-generating the fire-incident management situation in a virtual-immersion computer interface of the media server, wherein the fire-incident management situation includes a radio transmission simulation and an image representing a fire incident;

unlocking, by the processor using the unlocking module, access to the radio transmission simulation and the image representing the fire incident to the fire-incident management situation, in response to the completion of the previous fire-incident management situation and in accordance with the user profile including the completed modules with the acceptable scores;

revoking, by the processor using the revoker computer, access to the radio transmission simulation and the image representing the fire incident to the fire-incident management situation in response to the expiration period of a previous fire-incident management situation;

wherein the providing management mentoring comprises computer-generating mentoring in a management-mentor computer interface, wherein the mentoring comprises a video in which a speaker coaches the applicant;

unlocking, by processor using the unlocking module, access to the mentoring in the management-mentor computer, in response to the completion of a previous mentoring situation and in accordance with the user profile including the completed modules with the acceptable scores;

revoking, by the processor using the revoker computer, access to the mentoring in the management-mentor computer in response to the completion of the previous mentoring situation;

wherein the providing virtual immersion and the providing management mentoring provides training to the applicant in the fire incident management skill using a client-server architecture, wherein the plurality of servers comprise the content-regulation server, the user profile server, the database server, the testing server, and the media server;

unlocking, by the processor using the unlocking module, access to the train-the-trainer computer interface in response to completion of an online incident commander training course and in accordance with the user profile including the completed modules with the acceptable scores;

customizing, by the processor using a train-the-trainer computer interface, software, video, topography, resource levels and operating procedures of the Incident Commander Training and Certification Program according to the needs of local departments;

revoking, by the processor using the revoker computer, access to the train-the-trainer computer interface after the expiration period indicating the completion of the online incident commander training course;

specifying, by the processor using a user-specific progress status information module, successfully completed training modules;

resuming, by the processor, navigation in response to the successfully completed training modules;

controlling, by the processor using a regulation server, web page advancement; and providing, by the processor, access to a subsequent web page in response to completion of a prior webpage with the training module.

* * * * *